United States Patent
Gao et al.

(10) Patent No.: US 12,532,191 B2
(45) Date of Patent: Jan. 20, 2026

(54) COVERAGE ENHANCEMENT METHOD AND APPARATUS

(71) Applicant: Huawei Technologies Co., Ltd., Shenzhen (CN)

(72) Inventors: Quanzhong Gao, Shanghai (CN); Kai Xu, Shanghai (CN); Shaofeng Sun, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 336 days.

(21) Appl. No.: 18/148,359

(22) Filed: Dec. 29, 2022

(65) Prior Publication Data

US 2023/0138567 A1 May 4, 2023

Related U.S. Application Data

(63) Continuation of application No. PCT/CN2021/101839, filed on Jun. 23, 2021.

(30) Foreign Application Priority Data

Jun. 30, 2020 (CN) .......................... 202010624346.4

(51) Int. Cl.
   *H04W 16/28* (2009.01)
   *H04B 7/0413* (2017.01)
   *H04W 72/04* (2023.01)

(52) U.S. Cl.
   CPC .......... *H04W 16/28* (2013.01); *H04B 7/0413* (2013.01); *H04W 72/04* (2013.01)

(58) Field of Classification Search
   CPC .... H04B 7/0413; H04B 7/0695; H04B 7/088; H04L 5/001; H04L 5/003; H04L 5/0048; H04W 16/28; H04W 72/04
   See application file for complete search history.

(56) References Cited

U.S. PATENT DOCUMENTS 10,333,598 B2   6/2019   Luo
10,382,978 B2   8/2019   Lee et al.
(Continued)

FOREIGN PATENT DOCUMENTS

CN   105589506 A   5/2016
CN   106688260 A   5/2017
(Continued)

OTHER PUBLICATIONS

"3rd Generation Partnership Project; Technical Specification Group Radio Access Network; NR; Physical layer procedures for control (Release 16)," 3GPP TS 38.213 V16.1.0, Mar. 2020, 156 pages.
(Continued)

*Primary Examiner* — Awet Haile
(74) *Attorney, Agent, or Firm* — Slater Matsil, LLP

(57) ABSTRACT

A coverage enhancement method and an apparatus are disclosed. The method includes transmitting N first SSB beams in a first SSB beam set on a first initial bandwidth part BWP resource, and transmitting M second SSB beams in a second SSB beam set on a second initial BWP resource, where coverage of the first SSB beam set is located in a first partial area of a sector, coverage of the second SSB beam set is located in a second partial area of the sector, and N and M are positive integers. In this way, complementary coverage of a first SSB beam and a second SSB beam is implemented in the sector.

20 Claims, 9 Drawing Sheets

(56) References Cited

U.S. PATENT DOCUMENTS

| | | | | |
|---|---|---|---|---|
| 2020/0053613 A1* | 2/2020 | Cirik | ..................... | H04W 76/19 |
| 2020/0373990 A1* | 11/2020 | Da Silva | ............... | H04W 76/27 |
| 2021/0127355 A1* | 4/2021 | Gonzalez | .............. | H04W 68/02 |
| 2021/0344403 A1* | 11/2021 | Park | .................... | H04W 56/001 |
| 2023/0020284 A1* | 1/2023 | Soldati | ................. | H04L 5/0091 |

FOREIGN PATENT DOCUMENTS

| | | |
|---|---|---|
| CN | 110430583 A | 11/2019 |
| CN | 110708099 A | 1/2020 |
| WO | 2019030725 A1 | 2/2019 |

OTHER PUBLICATIONS

"Discussion on Potential Techniques for Coverage Enhancements," Source: vivo, Agenda Item: 8.4.2, Document for: Discussion and Decision, 3GPP TSG RAN WG1 #101, R1-2003437, e-Meeting, May 25-Jun. 5, 2020, 9 pages.

Nokia, Nokia Shanghai Bell, "[TP for SON BL CR for TS 38.423] Discussion and updates of slice load, beam load and TNL load reporting," 3GPP TSG-RAN WG3 Meeting #106, R3-196840, Nov. 18-22, 2019, 12 pages, Reno (NV), USA.

\* cited by examiner

COVERAGE ENHANCEMENT METHOD AND APPARATUS

CROSS-REFERENCE TO RELATED APPLICATIONS

This application is a continuation of International Application No. PCT/CN2021/101839, filed on Jun. 23, 2021, which claims priority to Chinese Patent Application No. 202010624346.4, filed on Jun. 30, 2020. The disclosures of the aforementioned applications are hereby incorporated by reference in their entireties.

TECHNICAL FIELD

This application relates to the field of wireless communication, and more specifically, to a coverage enhancement method and an apparatus.

BACKGROUND

Multiple-input multiple-output (MIMO) is applicable to an orthogonal frequency-division multiplexing (OFDM) system. A narrow beam is formed by using a beamforming (BF) technology that is a key technology that can improve coverage, improve spatial multiplexing, reduce interference, and improve spectral efficiency.

In a 4G era, a beam is a wide beam, and coverage is limited before a traffic beam. In a 5G era, a beam is a narrow beam, and covers an entire cell through beam scanning. However, there is a limitation on a quantity of synchronization signal block (SSB) beams. The $3^{rd}$ generation partnership project (3GPP) defines a quantity of new radio (NR) SSB beams of an initial downlink bandwidth part (BWP). For example, for a frequency division duplex (FDD) spectrum less than 3 GHz, a maximum quantity of SSB beams is 4.

Therefore, if an SSB forms a narrow beam, a horizontal or vertical range of a coverage envelope of the SSB is small, and the envelope is worse than an envelope of a data channel in some directions. If an SSB forms a wide beam, an obtained BF gain is small. In conclusion, coverage of an SSB beam is still worse than coverage of the data channel. Compared with coverage of a traffic channel, the coverage of the SSB beam can still be improved.

SUMMARY

Embodiments of this application provide a coverage enhancement method and an apparatus, to improve an SSB beam coverage gain of a system.

According to a first aspect, this application provides a coverage enhancement method. The method may be performed by a first communication apparatus. The first communication apparatus may be a communication device or a communication apparatus that can support a function required by the communication device to implement the method, for example, a chip. For example, the first communication apparatus may be a network device, a chip disposed in the network device and configured to implement a function of the network device, or another component configured to implement the function of the network device.

The first communication apparatus may transmit N first SSB beams in a first SSB beam set on a first initial BWP resource; and transmit M second SSB beams in a second SSB beam set on a second initial BWP resource, where coverage of the first SSB beam set is located in a first partial area of a sector, coverage of the second SSB beam set is located in a second partial area of the sector, and N and M are positive integers.

For example, in a dual connectivity scenario, the first communication apparatus may include a dual-connectivity primary base station and secondary base station. In this case, for example, the primary base station may transmit the first SSB beam in the first SSB beam set, and the secondary base station may transmit the second SSB beam in the second SSB beam set. For another example, in a carrier aggregation scenario, the first communication apparatus may be a base station having a carrier aggregation capability. In this case, the first communication apparatus may transmit the first SSB beam in the first SSB beam set, and may further transmit the second SSB beam in the second SSB beam set. The first SSB beam and the second SSB beam may be for implementing carrier aggregation.

According to the foregoing method, the first communication apparatus may transmit one SSB beam set on one initial BWP resource, so that the first communication apparatus can allocate at least two initial BWP resources in one sector, to transmit SSB beams in at least two SSB beam sets in the sector. For example, the N first SSB beams in the first SSB beam set are transmitted on the first initial bandwidth part BWP resource, and the M second SSB beams in the second SSB beam set are transmitted on the second initial BWP resource. The first SSB beam is transmitted in the first partial area of the sector, and the second SSB beam is transmitted in the second partial area of the sector, so that there is a gain for implementing coverage of the SSB beams in the sector in a case in which beam directions of different SSB beam sets are located at different locations compared with a case in which beam directions of a single SSB beam set are located at a same location.

In a possible implementation, the first initial BWP resource and the second initial BWP resource are located on different carriers.

According to the foregoing method, the first communication apparatus may allocate different SSB beam sets to different carriers, to improve flexibility of allocating BWP resources to the SSB beam sets.

In a possible implementation, a band in which the first initial BWP resource is located is different from a band in which the second initial BWP resource is located.

According to the foregoing method, the first communication apparatus may allocate, to different bands based on a requirement, initial BWP resources corresponding to different SSB beam sets, to improve flexibility of allocating the BWP resources to the SSB beam sets.

In another possible implementation, a band in which the first initial BWP resource is located is the same as a band in which the second initial BWP resource is located.

According to the foregoing method, the first communication apparatus may allocate, to a same band based on a requirement, initial BWP resources of different SSB beam sets, to improve flexibility of allocating the BWP resources to the SSB beam sets.

In a possible implementation, the first partial area and the second partial area are the same in a vertical direction, and are different in a horizontal direction.

According to the foregoing method, the coverage of the first SSB beam set and the coverage of the second SSB beam set can implement a complementary gain in one sector in the horizontal direction, to improve an SSB beam coverage gain in the sector in the horizontal direction.

In a possible implementation, the first partial area and the second partial area are the same in a horizontal direction, and are different in a vertical direction.

According to the foregoing method, the coverage of the first SSB beam set and the coverage of the second SSB beam set can implement a complementary gain in one sector in the vertical direction, to improve an SSB beam coverage gain in the sector in the vertical direction.

In a possible implementation, the first partial area and the second partial area are at least partially the same and partially different in a horizontal direction, and/or the first partial area and the second partial area are at least partially the same and partially different in a vertical direction.

According to the foregoing method, the coverage of the first SSB beam set may partially overlap the coverage of the second SSB beam set. For example, the first SSB beam set is located in a left area of the sector, the second SSB beam is located in a right area of the sector, and a middle area of the sector is covered by both the first SSB beam set and the second SSB beam set. For another example, the first SSB beams in the first SSB beam set and the second SSB beams in the second SSB beam set are alternately distributed. In an area in which coverage of the first SSB beams and coverage of the second SSB beams are the same or adjacent, a receiving end may receive both the first SSB beams and the second SSB beams that are transmitted by the first communication apparatus, to improve robustness of SSB beam coverage.

In a possible implementation, at least one beam direction in the first SSB beam set and at least one beam direction in the second SSB beam set are located in different areas in the horizontal direction; and/or at least one beam direction in the first SSB beam set and at least one beam direction in the second SSB beam set are located in different areas in the vertical direction.

According to the foregoing method, coverage of the first SSB beams in the first SSB beam set may partially overlap coverage of the first SSB beams in the second SSB beam set. For example, the first SSB beams and the second SSB beams are alternately distributed in the sector. For example, an adjacent beam of the first SSB beam is the second SSB beam. For another example, adjacent beams of a plurality of consecutive first SSB beams are a plurality of consecutive second SSB beams. In this manner, the receiving end may receive, at a plurality of locations, both the first SSB beams and the second SSB beams that are transmitted by the first communication apparatus, to improve robustness of the SSB beam coverage.

In a possible implementation, the N first SSB beams are periodically transmitted; and the M second SSB beams are periodically transmitted.

According to the foregoing method, the first communication apparatus periodically transmits the N first SSB beams in the first SSB beam set, and periodically transmits the M second SSB beams in the second SSB beam set, so that the first communication apparatus covers the first partial area and the second partial area in the sector through scanning. In this way, the receiving end in the sector can access, by receiving the first SSB beams and/or receiving the second SSB beams, a cell corresponding to the sector.

In a possible implementation, beam directions of the N first SSB beams transmitted in a first periodicity and a second periodicity are the same; and beam directions of the M second SSB beams transmitted in the first periodicity and the second periodicity are the same.

In this application, the first periodicity and the second periodicity each may be any one of sending periodicities of SSB beam sets, may be a continuous periodicity, or may be a discontinuous periodicity. This is not limited herein. According to the foregoing method, the first communication apparatus can fix a transmission direction of an SSB beam, to reduce complexity of the first communication apparatus.

In a possible implementation, at least one of the N first SSB beams is transmitted in different beam directions in a first periodicity and a second periodicity; and/or at least one of the M second SSB beams is transmitted in different beam directions in a first periodicity and a second periodicity.

According to the foregoing method, the first communication apparatus can send an SSB beam in different directions in different periodicities, so that in a plurality of periodicities, directions of one SSB beam can cover a plurality of locations in the sector. In this way, the receiving end can measure the SSB beam in the plurality of periodicities at a same location, and even can measure SSB beams in different SSB beam sets, to improve accuracy of beam pairing at the receiving end.

In a possible implementation, a location, in the sector, of the first partial area covered by the first SSB beam set in the first periodicity is different from a location, in the sector, of the first partial area covered by the first SSB beam set in the second periodicity; and/or a location, in the sector, of the second partial area covered by the second SSB beam set in the first periodicity is different from a location, in the sector, of the second partial area covered by the second SSB beam set in the second periodicity.

According to the foregoing method, the first communication apparatus can send an SSB beam in different directions in different periodicities, so that in a plurality of periodicities, one SSB beam set may cover a plurality of partial areas in the sector. In this way, at any location of the sector, the receiving end can reception beams in different SSB beam sets in the plurality of periodicities, so that the SSB beams can be measured, an effect of beam pairing performed by the receiving end is improved, and robustness of the SSB beams is improved.

In a possible implementation, the N first SSB beams and the M second SSB beams are transmitted at a same moment; or the N first SSB beams and the M second SSB beams are transmitted at different moments.

According to the foregoing method, the first communication apparatus can simultaneously transmit the first SSB beam and the second SSB beam, or can separately transmit the first SSB beam and the second SSB beam, to improve flexibility of transmitting the SSB beams by the first communication apparatus.

According to a second aspect, this application provides a coverage enhancement method. The method may be performed by a second communication apparatus. The second communication apparatus may be a communication device or a communication apparatus that can support a function required by the communication device to implement the method, for example, a chip. For example, the second communication apparatus may alternatively be a terminal device, a chip disposed in the terminal device and configured to implement a function of the terminal device, or another component configured to implement the function of the terminal device.

The second communication apparatus may receive N1 first SSB beams in a first SSB beam set on a first initial BWP resource, and/or receive M1 second SSB beams in a second SSB beam set on a second initial BWP resource, where the first SSB beam set covers a first partial area of a sector, the second SSB beam set covers a second partial area of the sector, and N1 and M1 are positive integers. In this way, the second communication apparatus accesses, based on the first initial BWP resource, a cell corresponding to the first SSB beam set; and accesses, based on the second initial BWP resource, a cell corresponding to the second SSB beam set.

For example, in a dual connectivity scenario, that the second communication apparatus receives the first SSB beam is used as an example. The second communication apparatus may access a cell corresponding to the first SSB beam, and use the cell as a primary cell. The second communication apparatus accesses, by using the second initial BWP resource, a cell corresponding to the second SSB beam, where the cell may be used as a secondary cell of the second communication apparatus. That the second communication apparatus receives both the first SSB beam and the second SSB beam is used as an example. In this case, the second communication apparatus may determine, based on signal quality of the received first SSB beam and second SSB beam, an SSB beam having good signal quality, for example, the first SSB beam, and use a cell corresponding to the SSB beam as a primary cell. For another example, in a carrier aggregation scenario, that the second communication apparatus receives the first SSB beam is still used as an example. In this case, the second communication apparatus may access a cell corresponding to the first SSB beam, use a carrier corresponding to the first SSB beam as a primary carrier, access, by using the second initial BWP resource, a cell corresponding to the second SSB beam, and use a carrier corresponding to the second SSB beam as a secondary carrier, to implement carrier aggregation.

According to the foregoing method, regardless of whether the second communication apparatus receives the first SSB beam or the second SSB beam, or receives both the first SSB beam and the second SSB beam, the second communication apparatus can access both the cell corresponding to the first SSB beam and the cell corresponding to the second SSB beam. Therefore, in a dual connectivity or carrier aggregation manner, the second communication apparatus can receive coverage of more SSB beams in the sector, to implement SSB beam coverage enhancement.

In a possible implementation, the first initial BWP resource and the second initial BWP resource are located on different carriers.

According to the foregoing method, the second communication apparatus can access, on different carriers, cells corresponding to a plurality of SSB beams, to improve resource utilization of a system.

In a possible implementation, a band in which the first initial BWP resource is located is different from a band in which the second initial BWP resource is located.

According to the foregoing method, the second communication apparatus can access, in different bands, the cells corresponding to the plurality of SSB beams, to improve resource utilization of the system.

In a possible implementation, the first partial area and the second partial area are the same in a vertical direction, and are different in a horizontal direction.

According to the foregoing method, the second communication apparatus can obtain an SSB beam coverage gain in the horizontal direction.

In a possible implementation, the first partial area and the second partial area are the same in a horizontal direction, and are different in a vertical direction.

According to the foregoing method, the second communication apparatus can obtain an SSB beam coverage gain in the vertical direction.

In a possible implementation, the first partial area and the second partial area are at least partially the same and partially different in a horizontal direction, and/or the first partial area and the second partial area are at least partially the same and partially different in a vertical direction.

According to the foregoing method, the second communication apparatus can receive the first SSB beam and the second SSB beam at a plurality of locations (a same area in the first partial area and the second partial area) of the sector. Therefore, the second communication apparatus may further measure the first SSB beam and the second SSB beam, to improve beam pairing performance.

In a possible implementation, at least one beam direction in the first SSB beam set and at least one beam direction in the second SSB beam set are located in different areas in the horizontal direction; and/or at least one beam direction in the first SSB beam set and at least one beam direction in the second SSB beam set are located in different areas in the vertical direction.

According to the foregoing method, the second communication apparatus can receive the first SSB beam and the second SSB beam at a location at which the first SSB beam is adjacent to or partially the same as the second SSB beam. Therefore, the second communication apparatus may further measure the first SSB beam and the second SSB beam, to improve beam pairing performance.

In a possible implementation, the N1 first SSB beams are periodically received; and/or the M1 second SSB beams are periodically received.

According to the foregoing method, the second communication apparatus can periodically receive the first SSB beam and/or periodically receive the second SSB beam, to reduce complexity of receiving the SSB beam by the second communication apparatus.

In a possible implementation, beam directions of the N1 first SSB beams received in a first periodicity and a second periodicity are the same; and/or beam directions of the M1 second SSB beams received in a first periodicity and a second periodicity are the same.

According to the foregoing method, the second communication apparatus can determine a paired SSB beam by using a first SSB beam successfully received for a single time and/or second SSB beam successfully received for a single time, to reduce complexity of receiving the SSB beam by the second communication apparatus, and effectively reduce a latency.

In a possible implementation, at least one of the N1 first SSB beams is received in different beam directions in a first periodicity and a second periodicity; and/or at least one of the M1 second SSB beams is received in different beam directions in a first periodicity and a second periodicity.

According to the foregoing method, the second communication apparatus can determine a paired SSB beam by using first SSB beams received for a plurality of times and/or second SSB beams received for a plurality of times, to improve a success rate of receiving the SSB beams by the second communication apparatus.

In a possible implementation, a location, in the sector, of the first partial area covered by the first SSB beam set in the first periodicity is different from a location, in the sector, of the first partial area covered by the first SSB beam set in the second periodicity; and/or a location, in the sector, of the second partial area covered by the second SSB beam set in the first periodicity is different from a location, in the sector, of the second partial area covered by the second SSB beam set in the second periodicity.

According to the foregoing method, the second communication apparatus can receive the first SSB beam and the second SSB beam at any location of the sector in a plurality of periodicities, so that the second communication apparatus can access a corresponding cell based on the received first SSB beam and second SSB beam, to improve an SSB beam coverage gain.

In a possible implementation, before accessing, based on the first initial BWP resource, the cell corresponding to the first SSB beams, the method further includes: measuring the N1 first SSB beams; and/or before accessing, based on the second initial BWP resource, the cell corresponding to the second SSB beams, the method further includes measuring the M1 second SSB beams.

According to the foregoing method, the second communication apparatus can measure the received first SSB beam and the received second SSB beam in the plurality of periodicities, to perform better SSB beam pairing, and improve transmission performance of the second communication apparatus.

In a possible implementation, the N1 first SSB beams and the M1 second SSB beams are received at a same moment; or the N1 first SSB beams and the M1 second SSB beams are received at different moments.

According to the foregoing method, a manner in which the second communication apparatus receives the first SSB beam and the second SSB beam can be more flexible, to adapt to second communication apparatuses having different capabilities and locations of the second communication apparatuses, and effectively improve gains of SSB beam coverage in different scenarios.

According to a third aspect, this application provides a communication apparatus. For example, the communication apparatus is the foregoing first communication apparatus. The first communication apparatus is configured to perform the method according to any one of the first aspect or the possible implementations. Specifically, the first communication apparatus may include modules configured to perform the method according to any one of the first aspect or the possible implementations, for example, include a processing module and a transceiver module. For example, the transceiver module may include a sending module and a receiving module. The sending module and the receiving module may be different function modules, or may be a same function module that can implement different functions. For example, the first communication apparatus is a communication device, or is a chip or another component disposed in the communication device. For example, the communication device is a network device. For example, the transceiver module may alternatively be implemented by using a transceiver, and the processing module may alternatively be implemented by using a processor. Alternatively, the sending module may be implemented by using a transmitter, and the receiving module may be implemented by using a receiver. The transmitter and the receiver may be different function modules, or may be a same function module that can implement different functions. If the first communication apparatus is the communication device, the transceiver is implemented, for example, by using an antenna, a feeder, and a codec in the communication device. Alternatively, if the first communication apparatus is the chip disposed in the communication device, the transceiver (or the transmitter and the receiver) is, for example, a communication interface in the chip. The communication interface is connected to a radio frequency transceiver component in the communication device, to implement information receiving and sending by using the radio frequency transceiver component.

For technical effects brought by the third aspect or the optional implementations of the third aspect, refer to the descriptions of the technical effects of the first aspect or the corresponding possible implementations of the first aspect.

According to a fourth aspect, this application provides a communication apparatus. For example, the communication apparatus is the foregoing second communication apparatus. The second communication apparatus is configured to perform the method according to any one of the second aspect or the possible implementations. Specifically, the second communication apparatus may include modules configured to perform the method according to any one of the second aspect or the possible implementations, for example, include a processing module and a transceiver module. For example, the transceiver module may include a sending module and a receiving module. The sending module and the receiving module may be different function modules, or may be a same function module that can implement different functions. For example, the first communication apparatus is a communication device, or is a chip or another component disposed in the communication device. For example, the communication device is a terminal device. For example, the transceiver module may alternatively be implemented by using a transceiver, and the processing module may alternatively be implemented by using a processor. Alternatively, the sending module may be implemented by using a transmitter, and the receiving module may be implemented by using a receiver. The transmitter and the receiver may be different function modules, or may be a same function module that can implement different functions. If the second communication apparatus is the communication device, the transceiver is implemented, for example, by using an antenna, a feeder, and a codec in the communication device. Alternatively, if the second communication apparatus is the chip disposed in the communication device, the transceiver (or the transmitter and the receiver) is, for example, a communication interface in the chip. The communication interface is connected to a radio frequency transceiver component in the communication device, to implement information receiving and sending by using the radio frequency transceiver component.

For technical effects brought by the fourth aspect or the optional implementations of the fourth aspect, refer to the descriptions of the technical effects of the second aspect or the corresponding possible implementations of the second aspect.

According to a fifth aspect, a communication apparatus is provided. The communication apparatus is, for example, the foregoing first communication apparatus. The communication apparatus includes a processor and a communication interface. The communication interface may be configured to communicate with another apparatus or device. Optionally, the communication apparatus may further include a memory, configured to store computer instructions. The processor and the memory are coupled to each other, and are configured to implement the method according to the first aspect or the possible implementations. Alternatively, the first communication apparatus may not include a memory, and the memory may be located outside the first communication apparatus. The processor, the memory, and the communication interface are coupled to each other, and are configured to implement the method according to the first aspect or the possible implementations. For example, when the processor executes the computer instructions stored in the memory, the first communication apparatus is enabled to perform the method according to any one of the first aspect or the possible implementations. For example, the first communication apparatus is a communication device, or is a chip or another component disposed in the communication device. For example, the communication device is a network device. If the first communication apparatus is the communication device, the communication interface is implemented by using, for example, a transceiver (or a transmitter and a receiver) in the communication device. For example, the transceiver is implemented by using an antenna, a feeder, a codec, or the like in the communication device. Alternatively, if the first communication apparatus is the chip disposed in the communication device, the communication interface is, for example, an input/output interface such as an input/output pin of the chip. The communication interface is connected to a radio frequency transceiver component in the communication device, to implement information receiving and sending by using the radio frequency transceiver component.

According to a sixth aspect, a communication apparatus is provided. The communication apparatus is, for example, the foregoing second communication apparatus. The communication apparatus includes a processor and a communication interface. The communication interface may be configured to communicate with another apparatus or device. Optionally, the communication apparatus may further include a memory, configured to store computer instructions. The processor and the memory are coupled to each other, and are configured to implement the method according to the second aspect or the possible implementations. Alternatively, the second communication apparatus may not include a memory, and the memory may be located outside the second communication apparatus. The processor, the memory, and the communication interface are coupled to each other, and are configured to implement the method according to the second aspect or the possible implementations. For example, when the processor executes the computer instructions stored in the memory, the second communication apparatus is enabled to perform the method according to any one of the second aspect or the possible implementations. For example, the second communication apparatus is a communication device, or is a chip or another component disposed in the communication device. For example, the communication device is a terminal device. If the second communication apparatus is the communication device, the communication interface is implemented by using, for example, a transceiver (or a transmitter and a receiver) in the communication device. For example, the transceiver is implemented by using an antenna, a feeder, a codec, or the like in the communication device. Alternatively, if the second communication apparatus is the chip disposed in the communication device, the communication interface is, for example, an input/output interface such as an input/output pin of the chip. The communication interface is connected to a radio frequency transceiver component in the communication device, to implement information receiving and sending by using the radio frequency transceiver component.

According to a seventh aspect, this application provides a communication system. The communication system includes the first communication apparatus according to the third aspect or the communication apparatus according to the fifth aspect, and includes the second communication apparatus according to the fourth aspect or the communication apparatus according to the sixth aspect.

According to an eighth aspect, a computer-readable storage medium is provided. The computer-readable storage medium is configured to store a computer program. When the computer program is run on a computer, the computer is enabled to perform the method according to any one of the first aspect or the possible implementations.

According to a ninth aspect, a computer-readable storage medium is provided. The computer-readable storage medium is configured to store a computer program. When the computer program is run on a computer, the computer is enabled to perform the method according to any one of the second aspect or the possible implementations.

According to a tenth aspect, a computer program product including instructions is provided. The computer program product is configured to store a computer program. When the computer program is run on a computer, the computer is enabled to perform the method according to any possible implementation of the first aspect or the second aspect.

DETAILED DESCRIPTION OF ILLUSTRATIVE EMBODIMENTS

Figure 1A:
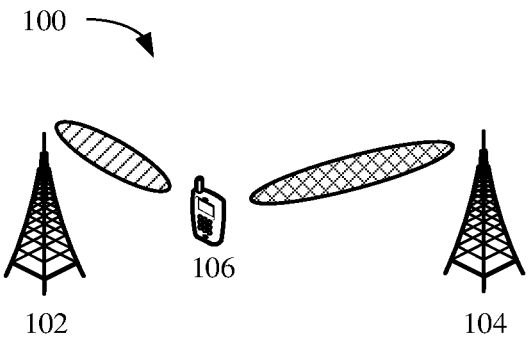
FIG. 1a is a schematic diagram of a communication system used in this application.

The following describes embodiments of this application with reference to accompanying drawings.

Dual connectivity (DC): A terminal device is connected to two base stations simultaneously. The two base stations connected to the terminal device may be base stations in a same radio access technology. For example, both are base stations in an LTE communication system, or both are base stations in a 5G communication system. Alternatively, the two base stations connected to the terminal device may be base stations in different radio access technologies. For example, one is a base station in an LTE communication system, and the other is a base station in a 5G communication system.

Carrier aggregation (CA): In a CA technology, a plurality of component carriers (CCs) may be aggregated to provide a service for one terminal device, to implement a larger transmission bandwidth and effectively improving an uplink/downlink transmission rate. The plurality of carriers generally include one primary carrier and one or more secondary carriers. A cell working on the primary carrier is a primary cell (PCell). The PCell is a cell that a terminal initially accesses, and a base station in which the PCell is located is responsible for performing radio resource control (RRC) communication with the terminal. A cell working on a secondary carrier is a secondary cell (SCell), and the SCell may provide an additional radio resource for the terminal.

In a new radio (NR) system specified in the 3rd generation partnership project (3GPP) protocol, frequency ranges of wireless transmission are classified into an FR1 band and an FR2 band. A frequency range of the FR1 band is 410 MHz to 7125 MHz, and a frequency range of the FR2 band is 24.25 GHz to 52.6 GHz. The FR2 band is located in a high band, and is usually referred to as a millimeter wave (mmWave). According to 5G NR protocols, beamforming is applicable to a sub-6 GHz band and the mmWave band. In a carrier aggregation scenario, a plurality of carriers may be configured for one terminal device, and each configured carrier is referred to as a subcarrier (Component Carrier, CC). A subcarrier in FR1, a subcarrier in FR2, or both the subcarrier in FR1 and the subcarrier in FR2 may be configured for the terminal device.

Beam

Beam: The beam is a communication resource. The beam may be a wide beam, a narrow beam, or a beam of another type. Different beams may be considered as different resources (space domain resources). A technology for forming the beam may be a beamforming technology or another technical means. The beamforming technology may be specifically a digital beamforming technology, an analog beamforming technology, or a hybrid digital/analog beamforming technology. Same information or different information may be sent by using the different beams. Optionally, a plurality of beams having a same communication feature or similar communication features may be considered as one beam. The beam may include one or more antenna ports, configured to transmit a data channel, a control channel, a sounding signal, and the like. For example, a transmission beam may be signal strength distribution formed in different directions in space after a signal is transmitted through an antenna, and a reception beam may be signal strength distribution, in different directions in space, of a radio signal received from an antenna. It can be understood that the one or more antenna ports forming the beam may alternatively be considered as one antenna port set.

The beam in an NR protocol may be embodied as a spatial domain filter that is also referred to as a spatial filter or a spatial parameter (for example, a spatial receiving parameter and a spatial sending parameter). A beam for sending a signal may be referred to as a transmission beam (Tx beam), or may be referred to as a spatial domain transmission filter, a spatial transmission filter, a spatial domain transmission parameter, or a spatial transmission parameter. A beam for receiving a signal may be referred to as a reception beam (Rx beam), or may be referred to as a spatial domain reception filter, a spatial reception filter, a spatial domain reception parameter, or a spatial reception parameter.

In most cases, based on a physical characteristic of a radio wave, when a low band or an intermediate band is used, a signal may be sent omnidirectionally or sent at a wide angle. However, when a high band, particularly, a super high band, is used, because an antenna size is generally based on ½ wavelength, when a carrier frequency increases, an antenna becomes smaller, and more antennas can be accommodated in same space as a low band. An antenna array including many antenna elements may be disposed at a transmitting end and a receiving end. In addition, due to the increase in the carrier frequency, a path loss and a penetration loss increase. A narrow beam may be formed by using the beamforming technology, and formed narrow beam sweeping covers an entire cell. In this way, coverage can be improved, spatial multiplexing can be improved, interference can be reduced, and spectral efficiency can be improved, for example, massive MIMO.

In the beamforming technology, a parameter of a basic unit of a phase array is adjusted, so that signals at some angles obtain constructive interference, and signals at some other angles obtain destructive interference, to implement signal enhancement at some angles and in some directions. Beamforming generates a directional beam, and the beam is aimed at a target terminal device. In addition, transmit signals of a plurality of antennas are coherently superposed on the target terminal device, to improve a demodulation signal-to-noise ratio of the target terminal device and improving user experience at a cell edge. A beamforming weight varies with a radio channel environment, to ensure that the beam is aimed at a target user at any moment. A manner of obtaining a downlink weighting vector through beamforming is generally measuring an uplink channel by using a sounding reference signal (SRS), and performing weighting calculation by using algorithms such as eigen beamforming (EBF), equal gain transmission (EGT), and maximum ratio transmission (MRT).

In this application, a quantity of channels on which a network device may use beamforming is greater than or equal to 16, to implement joint coverage of a plurality of channels in a same sector or a same area.

Beam management may be divided into the following several parts: initial beam setup; beam adjustment mainly for adapting to movement and rotation of a terminal device and a slow change in an environment; and beam recovery for processing a situation in which a rapidly changing environment destroys a current beam pair.

An existing initial beam establishment procedure is as follows.

A beam establishment initiator sends a plurality of SSBs, these SSBs are sequentially sent, and each SSB is carried on a different beam.

A synchronization signal block is a combination of a physical broadcast channel (PBCH) and a primary synchronization signal (PSS)/secondary synchronization signal (SSS) in NR, occupies four consecutive symbols in time domain, and occupies 20 RBs in frequency domain, to form an SS/PBCH block. The SSB supports subcarrier spacings of 15 kHz/30 kHz (below 6 GHz) and 120 kHz/240 kHz (above 6 GHz).

The PSS and the SSS each occupy one symbol in time domain, and occupy 127 resource elements (REs) in frequency domain. The PSS occupies a symbol 0 in the SS/PBCH block, and the SSS occupies a symbol 2 in the SS/PBCH block. The PBCH occupies a symbol 1 and a symbol 3 in the SS/PBCH block, and further occupies some REs in the symbol 2.

The SSB supports beam scanning, and the scanning needs to be completed within 5 ms. In a radio frame, the SSB can be sent in the first 5 ms (the first half-frame) or the last 5 ms (the second half-frame). An SSB burst includes a plurality of SSBs on which beam scanning is performed. A quantity of the SSBs in the SSB burst is referred to as an SSB burst size. For sub-3 G, a maximum of four SS/PBCH blocks are defined. For sub-3 G to sub-6 G, a maximum of eight SS/PBCH blocks are defined. For above 6 G, a maximum of 64 SS/PBCH blocks are defined.

SSB periodicities are 5 ms, 10 ms, 20 ms, 40 ms, 80 ms, and 160 ms. During initial cell search, the SSB periodicity is 20 ms.

The SSB may be associated with a downlink beam, or may be associated with a resource such as an uplink random access occasion or a preamble, so that a receiving end can obtain a related beam by using a random access procedure, to establish an initial beam pair. In a subsequent communication process, the receiving end maintains beams used during random access, and uses the beams as an optimal beam pair for sending. Unless there is another mechanism, the receiving end is triggered to select a better beam pair.

The following briefly describes a process of determining an optimal beam pair between a network device and a terminal device in a scenario. For example, the network device is a gNB, and the terminal device is UE.

After the UE performs accessing, and enters a connected mode, the gNB performs the following process by using a configured synchronization signal, to determine an optimal beam pair between the gNB and the UE. The synchronization signal may be an SSB.

First, the gNB sends the synchronization signal by using different transmission beams at different moments, and the UE measures the synchronization signal by using a fixed reception beam, and reports a measurement result to the gNB, so that the gNB selects an optimal beam. For example, the measurement result includes synchronization signal received power (RSRP) measurement values and/or signal-to-noise ratios (SNRs) corresponding to different transmission beams.

Then, the gNB always sends the synchronization signal by using the obtained optimal beam at different moments, and the UE measures, by using different reception beams, the synchronization signal sent by the gNB, to obtain an optimal beam of the UE. For example, the UE measures, by using the different reception beams, the synchronization signals sent by the gNB, to obtain RSRP measurement values corresponding to the different reception beams, and the UE selects a reception beam corresponding to a largest measurement value in the RSRP measurement values as the optimal beam.

In the foregoing process, the optimal beam determined by the gNB and the optimal beam determined by the UE are the optimal beam pair. The optimal beam pair may be further adjusted by repeating the foregoing process, to continuously ensure that the gNB and the UE always work on the optimal beam pair.

Technical solutions in embodiments of this application may be applied to various communication systems, for example, a long term evolution (LTE) system, a worldwide interoperability for microwave access (WiMAX) communication system, a future 5th generation (5G) system such as a new radio access technology (NR), and a future communication system such as a 6G system.

For ease of understanding embodiments of this application, a communication system shown in FIG. 1a is first used as an example to describe in detail a communication system used in embodiments of this application. FIG. 1a is a schematic diagram of a communication system used in a wireless broadcast beam coverage enhancement method according to an embodiment of this application. As shown in FIG. 1a, the communication system 100 includes a network device 102 and a terminal device 106. A plurality of antennas may be configured for the network device 102, and plurality of antennas may also be configured for the terminal device. Optionally, the communication system may further include a network device 104. A plurality of antennas may also be configured for the network device 104. It should be understood that the network device 102 or the network device 104 may further include a plurality of components (for example, a processor, a modulator, a multiplexer, a demodulator, or a demultiplexer) related to signal sending and receiving.

The network device is a device having a wireless transceiver function or a chip that may be disposed in the device. The device includes but is not limited to an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), an access point (AP) in a Wi-Fi system, a wireless relay node, a wireless backhaul node, a transmission point (transmission and reception point (TRP) or transmission point (TP)), or the like, may be a gNB or a transmission point (a TRP or a TP) in a 5G system such as an NR system or one antenna panel or one group (including a plurality of antenna panels) of antenna panels of a base station in the 5G system, or may be a network node that is included in the gNB or the transmission point, for example, the baseband unit (BBU) or a distributed unit (DU).

In this application, the network device may be an FDD NR device working on a sub-3 G FDD band and having channels of a quantity greater than or equal to 16, or may be a TDD NR device working on a sub-3 G TDD band (except N41) and having channels of a quantity greater than or equal to 16.

In some deployment, the gNB may include a central unit (CU) and the DU. The gNB may further include a radio unit (RU). The CU implements a part of functions of the gNB, and the DU implements a part of the functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information on the RRC layer eventually becomes information on the PHY layer, or is converted from information on the PHY layer. Therefore, in such an architecture, higher layer signaling, such as RRC layer signaling or PHCP layer signaling, may also be considered as being sent by the DU or sent by the DU and the RU. It may be understood that the network device may be a CU node, a DU node, or a device including the CU node and the DU node. In addition, the CU may be classified as a network device in an access network RAN, or the CU may be classified as a network device in a core network CN. This is not limited herein.

The terminal device may also be referred to as user equipment (UE), an access terminal, a subscriber unit, a subscriber station, a mobile station, a remote station, a remote terminal, a mobile device, a user terminal, a terminal, a wireless communication device, a user agent, or a user apparatus. The terminal device in embodiments of this application may be a mobile phone, a tablet (Pad), a computer having a wireless transceiver function, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. An application scenario is not limited in embodiments of this application. A terminal device having a wireless transceiver function and a chip that may be disposed in the terminal device are collectively referred to as a terminal device in this application.

In the communication system 100, both the network device 102 and the network device 104 may communicate with a plurality of terminal devices (for example, the terminal device 106 shown in the figure). The network device 102 and the network device 104 may communicate with one or more terminal devices similar to the terminal device 106. However, it should be understood that a terminal device communicating with the network device 102 and a terminal device communicating with the network device 104 may be the same, or may be different. The terminal device 106 shown in FIG. 1a may communicate with both the network device 102 and the network device 104. However, this shows only one possible scenario. In some scenarios, the terminal device may communicate with only the network device 102 or the network device 104. This is not limited in this application.

It should be understood that FIG. 1a is merely a simplified schematic diagram used as an example for ease of understanding. The communication system may further include another network device or another terminal device, which is not shown in FIG. 1a. In embodiments of this application, different base stations may be base stations having different identifiers, or may be base stations that have a same identifier and that are deployed at different geographical locations. Before a base station is deployed, the base station does not know whether the base station is involved in the scenario to which embodiments of this application are applied. Therefore, the base station or a baseband chip should support, before deployment, a method provided in embodiments of this application. It may be understood that the foregoing base stations having the different identifiers may be base station identifiers, or may be cell identifiers or other identifiers.

Embodiments of this application may be applied to a frequency division duplex (FDD) scenario, for example, a MIMO scenario. For example, in a future IMT system, the ITU proposes three types of communication scenarios. Enhanced mobile broadband mainly includes various consumer-oriented services, including web browsing, file download, text/voice/video chat, video, AR/VR, and the like. A requirement of a high-speed service increases, and a requirement of a network capacity increases greatly. In this case, MIMO may be used, to improve a coverage gain of a traffic channel. For example, embodiments of this application may be specifically applied to but are not limited to a scenario in which a network device and a terminal device establish a beam pair. For example, an eNB sends a synchronization signal to UE by using a plurality of beams, or UE sends a synchronization signal to an eNB by using a plurality of beams. The scenario may alternatively be a scenario in which an SSB coverage gain needs to be increased.

In a downlink transmission scenario, a network device sends data to a terminal device. A communication scenario is shown in FIG. 1a. In FIG. 1a, an LTE downlink (LTE DL) and a new radio downlink (NR DL) are established between a gNB, an ng-eNB, or an eNB and a terminal device, to provide control or configuration. In an uplink transmission scenario, a terminal device sends data to a network device. A communication scenario is shown in FIG. 1a. In FIG. 1a, an LTE uplink (LTE UL) and a new radio uplink (NR UL) are established between a gNB, an ng-eNB, or an eNB and a terminal device, to provide control or configuration.

In a carrier aggregation manner, when adding a primary carrier of a network device, a terminal device may further add a secondary carrier of the network device simultaneously. In embodiments of this application, the network device may configure a plurality of initial BWP resources, and one initial BWP resource may be used by the terminal device to access a beam corresponding to the initial BWP resource. To be specific, the terminal device may access and add, by using an initial BWP resource corresponding to the primary carrier, a beam corresponding to the primary carrier, and add, by using an initial BWP resource corresponding to the secondary carrier, a beam corresponding to the corresponding secondary carrier. It should be noted that an initial BWP resource may be for carrying one or more beam directions, one or more initial BWP resources may be located on different carriers, and the one or more initial BWP resources may be located in a same band, or may be located in different bands. For example, at least one initial BWP resource set for the network device belongs to different carriers in one band, may belong to different BWPs in different bands, or may be different BWP resources on one carrier. This is not limited herein.

In embodiments of this application, an area covered by a primary carrier and an area covered by a secondary carrier may be located in a same sector, or may be located in a same area (for example, a same geographical location area, or the areas may be located in a same cell, or may be adjacent cells), so that the terminal device can enhance coverage by adding the secondary carrier.

In the downlink transmission scenario, in FIG. 1a, an example in which the network device 102 is a 5G base station and the network device 104 is a 4G base station is used. In an NR-E-UTRA dual connectivity (NE-DC) scenario, an NR DL between the network device 102 and the terminal device 106 is a primary link, and an LTE DL between the network device 104 and the terminal device 106 is a secondary link. In an E-UTRA-NR dual connectivity (EN-DC) scenario, an LTE DL between the network device 104 and the terminal device 106 is a primary link, and an NR DL between the network device 102 and the terminal device 106 is a secondary link. In the uplink transmission scenario, in FIG. 1a, in an NR-E-UTRA dual connectivity (NE-DC) scenario, an NR UL between the network device 102 and the terminal device 106 is a primary link, and an LTE UL between the network device (for example, the network device 104) and the terminal device 106 is a secondary link. In an E-UTRA-NR dual connectivity (EN-DC) scenario, an LTE UL between the network device 104 and the terminal device 106 is a primary link, and an NR UL between the network device 102 and the terminal device 106 is a secondary link.

In embodiments of this application, the network device may configure the plurality of initial BWP resources, and one initial BWP resource may be used by the terminal device to access the corresponding beam. To be specific, the terminal device may access and add, by using an initial BWP resource corresponding to a primary cell, a beam corresponding to the primary cell, and add, by using an initial BWP resource corresponding to a secondary cell, a beam corresponding to the corresponding secondary cell. It should be noted that the initial BWP resource may be for carrying the one or more beam directions, the one or more initial BWP resources may be located on the different carriers, and the one or more initial BWP resources may be located in the same band, or may be located in the different bands.

In embodiments of this application, an area covered by a primary cell and an area covered by a secondary cell may be located in a same sector, or may be located in a same area (for example, a same geographical location area, or the areas may be located in a same cell, or may be adjacent cells), so that the terminal device can enhance coverage by adding the secondary cell.

Figure 1B:
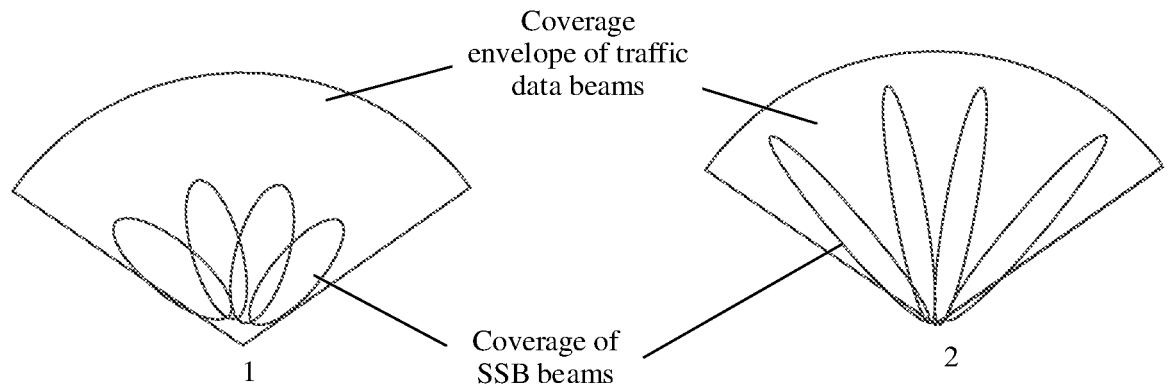
FIG. 1b is a schematic diagram of beam coverage according to this application.

FIG. 1b shows a formed coverage envelope of traffic beams and coverage formed by SSB beams. For a beam of a data channel, coverage enhancement may be implemented by using a BF technology, to form coverage envelopes (for example, envelopes in (1) in FIG. 1b and (2) in FIG. 1b) that are wide both horizontally and vertically; and beam scanning may also be performed on an SSB by using the BF technology, to enhance coverage. However, because a quantity of SSB beams is limited, especially an SSB in a sub-3 G band, only four beam directions are currently supported. As shown in (1) in FIG. 1b, if the SSB beams are wide beams, an obtained BF gain is small. As shown in (2) in FIG. 1b, if the SSB beams are narrow beams, a horizontal or vertical range of the coverage envelope of the SSB beams is small, and a signal hole is formed at a location between the SSB beams. The coverage envelope is worse than a coverage envelope of a traffic data beam, and a requirement of terminal access cannot be satisfied. Therefore, especially coverage of the SSB in the sub-3 G band is worse than coverage of the data channel currently.

Figure 2:
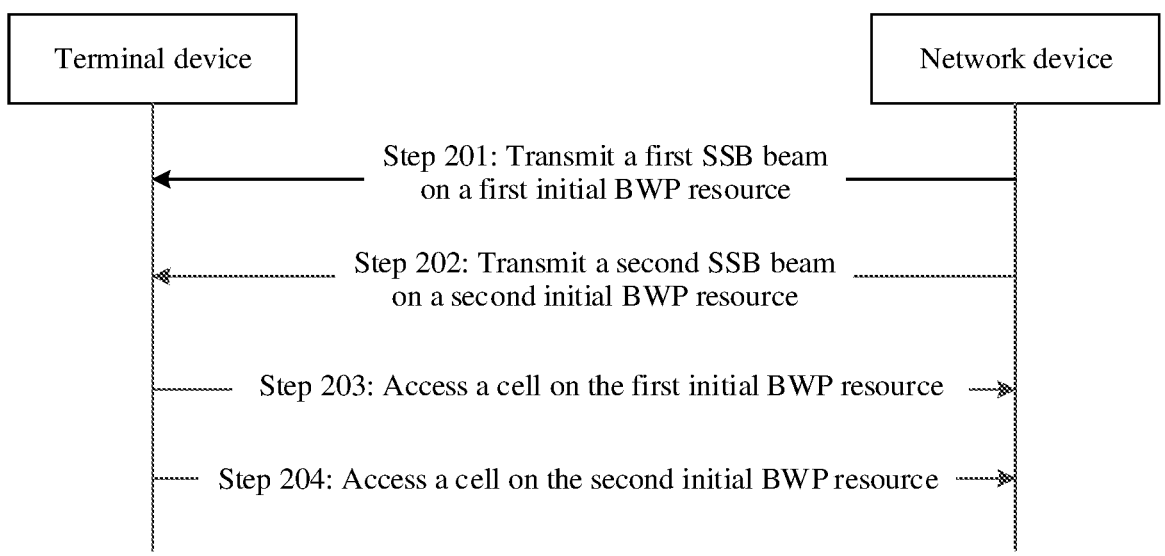
FIG. 2 is a schematic flowchart of a coverage enhancement method according to an embodiment of this application.

Based on the foregoing problem, embodiments of this application provide a coverage enhancement method. FIG. 2 is a schematic flowchart of a coverage enhancement method according to an embodiment of this application from a perspective of device interaction. It should be understood that the technical solutions in this application may be applied to a wireless communication system, for example, the communication system 100 shown in FIG. 1a. The communication system may include at least one network device and at least one terminal device. The network device and the terminal device may communicate with each other through a wireless air interface. For example, the network devices in the communication system may correspond to the network device 102 and the network device 104 shown in FIG. 1a, and the terminal device may correspond to the terminal device 106 shown in FIG. 1a.

Without loss of generality, the following describes embodiments of this application in detail by using an interaction process between a terminal device and a network device as an example. The terminal device may be a terminal device that is in a wireless communication system and that has a wireless connection relationship with the network device. It may be understood that an SSB may be transmitted, based on same technical solution, between the network device and a plurality of terminal devices that are in the wireless communication system and that have wireless connection relationships with the network device. This is not limited in this application. In embodiments of this application, an NR network scenario in a wireless communication network is used as an example to describe some scenarios. It should be noted that the solutions in embodiments of this application may further be applied to another wireless communication network, and a corresponding name may also be replaced with a name of a corresponding function in the another wireless communication network. As shown in FIG. 2, the method 200 may include the following steps.

Step 201: Transmit a first SSB beam on a first initial BWP resource.

The first initial BWP resource may include a downlink initial BWP resource and an uplink initial BWP resource corresponding to the downlink initial BWP resource. The first initial BWP resource may be for transmitting a synchronization signal of N first SSB beams. N is an integer greater than or equal to 1. A network device may transmit the N first SSB beams and a common PDCCH on the first initial BWP resource. After receiving the synchronization signal of the N first SSB beams, a terminal device may select, according to a beam pairing method, optimal beams from the N first SSB beams for access. In this way, the terminal device may access, perform incoming handover to, and camp on a cell based on the first initial BWP resource configured by the network device.

For ease of description below, the N first SSB beams may be referred to as a first SSB beam set.

An area covered by the N first SSB beams may correspond to an area covered by at least one traffic beam.

It should be noted that the area covered by the first SSB beam set may be an area covered by one traffic beam, may be an area covered by two or more traffic beams, or may be an area covered by one first SSB beam. This is not specifically limited in this application.

Step 202: Transmit a second SSB beam on a second initial BWP resource.

The second initial BWP resource may include a downlink initial BWP resource and an uplink initial BWP resource corresponding to the downlink initial BWP resource. The second initial BWP resource may be for transmitting a synchronization signal of M second SSB beams. M is an integer greater than or equal to 1. The network device may transmit the M second SSB beams and a common PDCCH on the second initial BWP resource. After receiving the synchronization signal of the M second SSB beams, the terminal device may select, according to the beam pairing method, optimal beams from the M second SSB beams for access. In this way, the terminal device may access, perform incoming handover to, and camp on a cell based on the second initial BWP resource configured by the network device. For ease of description below, the M second SSB beams may be referred to as a second SSB beam set. An area covered by the M second SSB beams may correspond to an area covered by at least one traffic beam.

For example, a maximum beam quantity of beams in a synchronization signal may be determined based on a pre-configuration, or may be determined based on a configuration of the network device. In this application, an example in which N and M are 4 is used for description. During actual application, there may alternatively be a larger quantity of beams. This is not limited herein. For example, the network device sends four SSB beams, and the terminal device selects at least one beam with an optimal signal as a transmission beam.

In a possible implementation, the network device may indicate beam information by using a transmission configuration indicator (TCI). For example, the TCI includes an identifier of a beam, and a beam indicated by each TCI may be used as a transmission beam or a reception beam. Each SSB beam corresponds to one TCI. An initially configured TCI may be carried by using RRC signaling, and a quantity of a plurality of first SSB beams may be determined based on a quantity of initially configured TCIs. Alternatively, the network device may carry a TCI by using a media access control control element (MAC CE), and the terminal device may determine a quantity of a plurality of second SSB beams based on a quantity of TCs carried in the MAC CE. Alternatively, the network device may carry a TCI by using downlink control information (DCI), and the terminal device may determine a quantity of a plurality of second SSB beams by using a quantity of TCIs carried in the DCI.

In an example, a quantity of the plurality of first SSB beams may be 2, 3, 4, 6, or 8, and the quantity of the plurality of second SSB beams may be 2, 3, 4, 6, 8, or the like.

A first communication apparatus may determine the quantity of the plurality of second beams according to a protocol specification or by receiving a configuration from the network device.

To implement coverage enhancement in a same area, coverage of the first SSB beam set and coverage of the second SSB beam set may be located in the same area, so that the terminal can access both a beam in the first SSB beam set and a beam in the second SSB beam set in a same area range, to implement coverage enhancement. The following provides descriptions by using an example in which the same area is a same sector. The coverage of the first SSB beam set is located in a first partial area of the sector, and the coverage of the second SSB beam set is located in a second partial area of the sector. When areas are a same geographical location area or other preset areas, refer to this example. Details are not described herein again. For example, the network device may establish a preset area, and store a beam transmit direction, a beam quantity, a hardware parameter, and the like that are set in the preset area. It should be understood that area division may be performed in a plurality of forms, and another parameter may further be included in addition to the beam transmit direction, the beam quantity, and the beam hardware parameter.

The following uses a 120-degree sector as an example. In the sector, at least two SSB beam sets may be set for coverage enhancement. The following uses two SSB beam sets (for example, the first SSB beam set and the second SSB beam set) for description. Specifically, Manner 1 to Manner 4 may be included.

Manner 1: The first SSB beam set and the second SSB beam set are located in different areas of the sector, the first SSB beams in the first SSB beam set provide continuous coverage, and the second SSB beams in the second SSB beam set provide continuous coverage.

Figure 3:
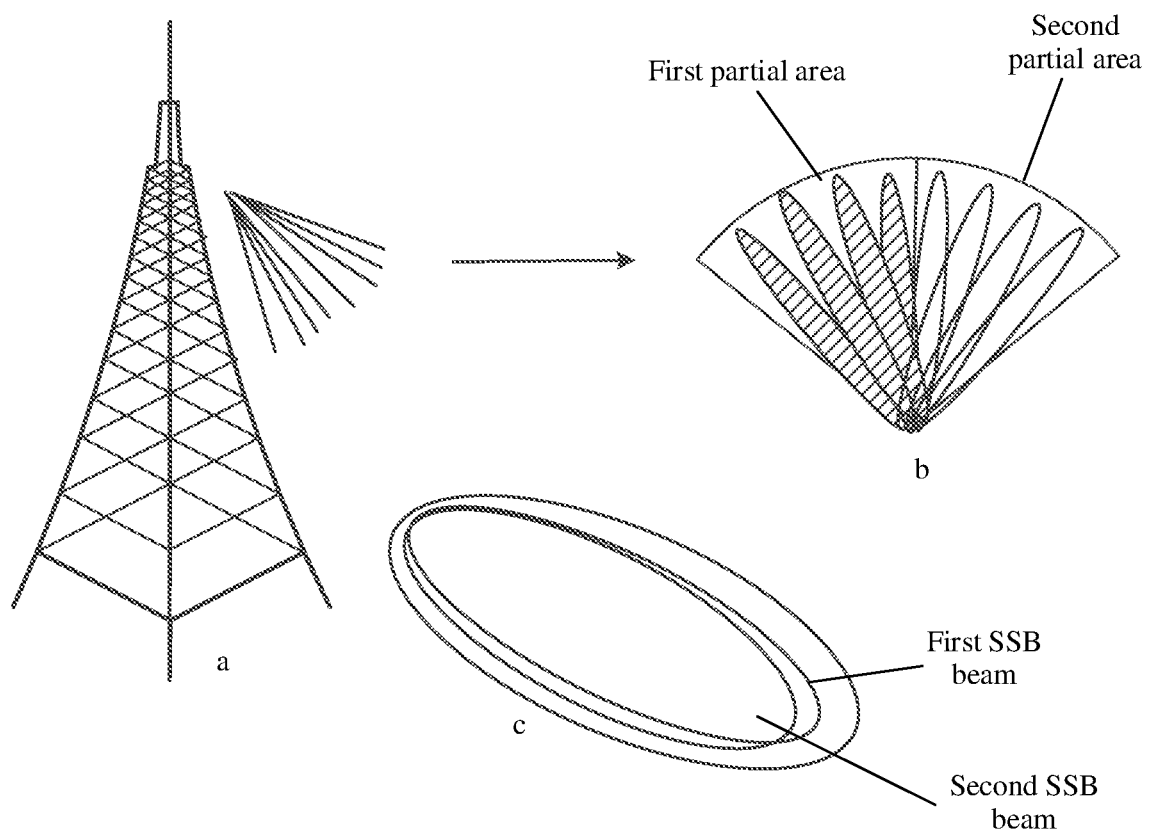
FIG. 3 is a schematic diagram of a coverage enhancement method according to an embodiment of this application.

Manner a1: The beam in the first SSB beam set and the beam in the second SSB beam set cover different areas in a horizontal direction, and cover a same area in a vertical direction.

b in FIG. 3 is a top view of beam directions. An area covered by the beams in the first SSB beam set is located in a left-side 60-degree area (the first partial area) of the 120-degree sector, and an area covered by the beams in the second SSB beam set is located in a right-side 60-degree area (the second partial area) of the 120-degree sector. c in FIG. 3 is a side view of beam directions. The area covered by the beams in the first SSB beam set is the same as the area covered by the beams in the second SSB beam set. The N first SSB beams are evenly distributed in the first partial area. The M second SSB beams are evenly distributed in the second partial area. As shown in the figure, four first SSB beams are evenly distributed in the first partial area, and four second SSB beams are evenly distributed in the second partial area. Therefore, eight SSB beams in different directions can cover the sector in the horizontal direction. A coverage gain can be effectively enhanced compared with an original manner in which only four SSB beams can cover a same sector.

Figure 4:
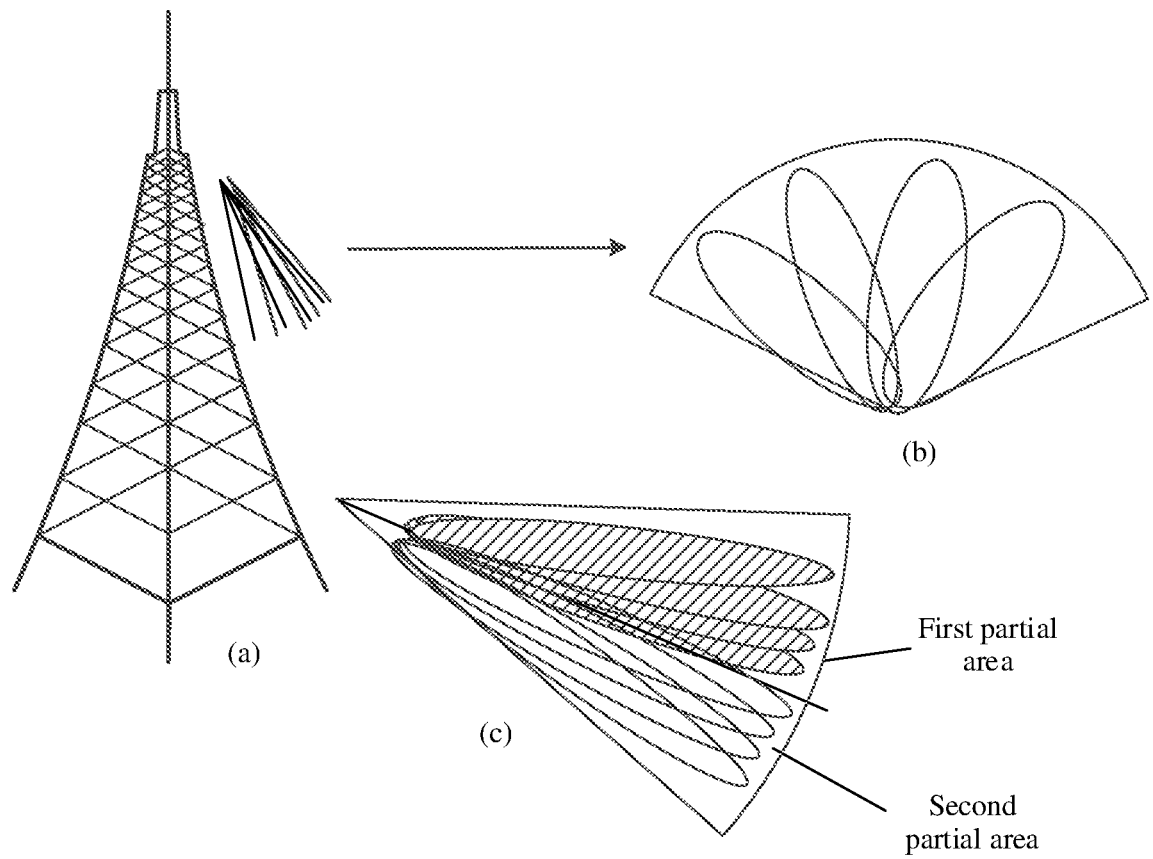
FIG. 4 is a schematic diagram of a coverage enhancement method according to an embodiment of this application.

Manner a2: The beam in the first SSB beam set and the beam in the second SSB beam set cover different areas in a vertical direction, and cover a same area in a horizontal direction.

c in FIG. 4 is a side view of beam directions. An area covered by the beams in the first SSB beam set is located in an upper half part (the first partial area) of an envelope of the sector in the vertical direction, and an area covered by the beams in the second SSB beam set is located in a lower half part (the second partial area) of the envelope of the sector in the vertical direction. The N first SSB beams are evenly distributed in the first partial area. The M second SSB beams are evenly distributed in the second partial area. For example, four first SSB beams in the vertical direction are located in the first partial area, and four second SSB beams in the vertical direction are located in the second partial area. Therefore, different SSB beam directions are covered in the vertical direction of the sector, so that coverage of the network device is enhanced in the vertical direction. In another possible implementation, four first SSB beams are evenly distributed in the first partial area, and four second SSB beams are evenly distributed in the second partial area. Therefore, eight SSB beams cover the sector. A coverage gain can be effectively enhanced compared with an original manner in which only four SSB beams can cover a same sector.

For another example, if a 180-degree sector is jointly covered by using the first SSB beam set, the second SSB beam set, and a third SSB beam set, an example in which the beam in the first SSB beam set, the beam in the second SSB beam set, and a beam in the third SSB beam set cover different areas in a horizontal direction and cover a same area in a vertical direction is used.

Figure 5:
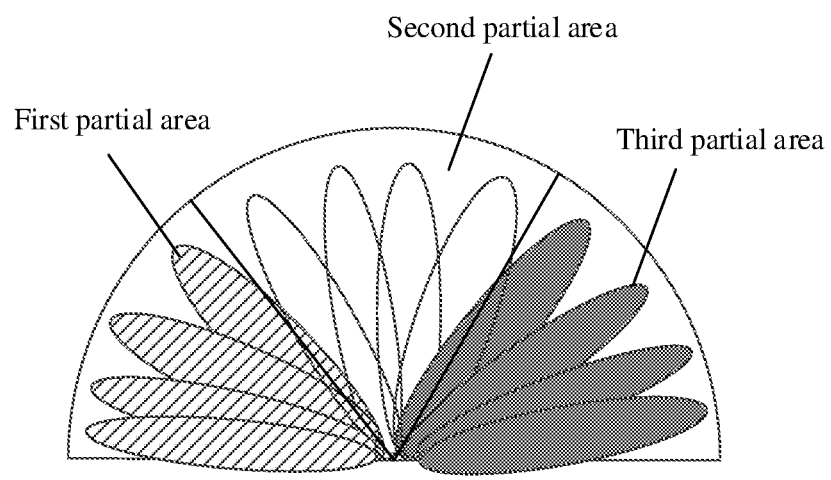
FIG. 5 is a schematic diagram of a coverage enhancement method according to an embodiment of this application.

In this case, FIG. 5 is a top view of beam directions. An area covered by the beams in the first SSB beam set is located in a left 60-degree area (the first partial area) of the 180-degree sector, an area covered by the beams in the second SSB beam set is located in a middle 60-degree area (the second partial area) of the 180-degree sector, and an area covered by beams in the third SSB beam set is located in a right 60-degree area (a third partial area) of the 180-degree sector. The N first SSB beams are evenly distributed in the first partial area. The M second SSB beams are evenly distributed in the second partial area. K third SSB beams are evenly distributed in the third partial area. As shown in the figure, four first SSB beams are evenly distributed in the first partial area, four second SSB beams are evenly distributed in the second partial area, and four third SSB beams are evenly distributed in the third partial area. Therefore, 12 SSB beams in different directions can cover the sector in the horizontal direction. A coverage gain can be effectively enhanced compared with an original manner in which only four SSB beams can cover a same sector.

Similarly, like manner a2, the beam in the first SSB beam set, the beam in the second SSB beam set, and a beam in a third SSB beam set may alternatively cover different areas in a vertical direction, and cover a same area in a horizontal direction. Details are not described herein again.

Manner 2: The first SSB beam set and the second SSB beam set are located in different areas of the sector, the first SSB beams in the first SSB beam set provide discontinuous coverage, the second SSB beams in the second SSB beam set provide discontinuous coverage, and the first SSB beam set and the second SSB beam set jointly form a continuous coverage area.

Manner b1: The first partial area covered by the N first SSB beams in the first SSB beam set and the second partial area covered by the M second SSB beams in the second SSB beam set partially overlap in a horizontal direction, and cover a same area in a vertical direction.

In the horizontal direction, non-overlapping areas in the first partial area and the second partial area and a partially overlapping area jointly cover an area of the sector in the horizontal direction.

Figure 6:
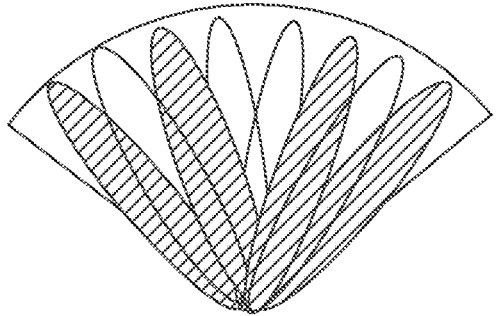
FIG. 6 is a schematic diagram of a coverage enhancement method according to an embodiment of this application.

FIG. 6 is a top view of beam directions. An area covered by the beams in the first SSB beam set is located in a 120-degree area in the sector, the N first SSB beams are discontinuously distributed (where the first partial area includes discontinuous areas covered by N first SSB beams), an area covered by the beams in the second SSB beam set is located in the 120-degree area in the sector, and the M second SSB beams are discontinuously distributed (where the second partial area includes discontinuous areas covered by the M second SSB beams). It may be understood as that one second SSB beam is located between at least two first SSB beams. It may also be understood as that, after the N first SSB beams are evenly distributed in the 120-degree sector, the second SSB beams are obtained by rotating the first SSB beams by a specific angle, so that a coverage area of the second SSB beams is located in a corresponding non-coverage area between the first SSB beams. A purpose of beam rotation is to cover a range that is not covered by the plurality of second beams. Therefore, a plurality of third beams obtained through rotation of the plurality of second beams may cover a part of the range that is not covered by the plurality of second beams. For example, a rotation angle may be ½ of an included angle between current adjacent beams. Rotation directions and/or rotation angles of the plurality of second SSB beams may be preconfigured, or may be determined based on an actual situation. In another example, the foregoing angle may be determined based on factors such as current channel quality between the network device and the terminal device or an area in which the terminal device is currently located in a serving cell. This is not limited in this application.

In a possible implementation, the area covered by the beams in the first SSB beam set is the same as the area covered by the beams in the second SSB beam set. Four first SSB beams are evenly distributed in the first partial area. Four second SSB beams are evenly distributed in the second partial area. One second SSB beam is located between two first SSB beams. Therefore, eight SSB beams in different directions can cover the sector in the horizontal direction. A coverage gain can be effectively enhanced compared with an original manner in which only four SSB beams can cover a same sector.

In Manner b1, in the vertical direction, a distribution manner of the first SSB beams in the first SSB beam set may be the same as the distribution manner of the first SSB beams in the first SSB beam set in Manner a1, and distribution of the second SSB beams in the second SSB beam set may be the same as the distribution of the second SSB beams in the second SSB beam set in Manner a1. Details are not described herein again.

Figure 7:
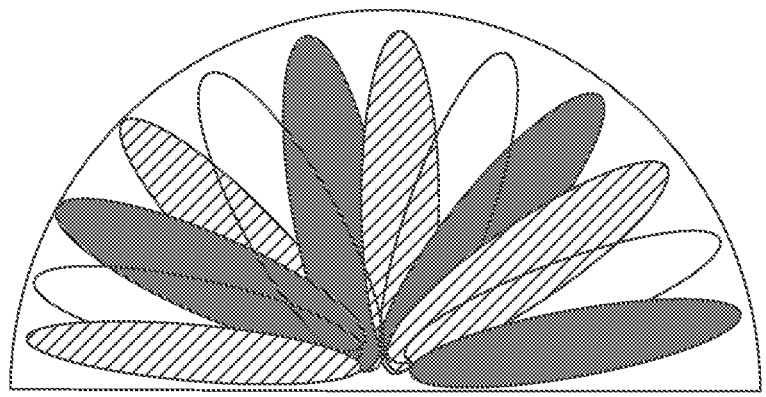
FIG. 7 is a schematic diagram of a coverage enhancement method according to an embodiment of this application.

For another example, if the first SSB beam set, the second SSB beam set, and a third SSB beam set jointly cover the sector, the first SSB beam set, the second SSB beam set, and the third SSB beam set may implement joint coverage by using the method in Manner 2. For example, as shown in FIG. 7, an example in which the first SSB beam set, the second SSB beam set, and the third SSB beam set jointly cover a 180-degree sector is used. Four first SSB beams in the first SSB beam set may be evenly distributed in the 180-degree sector, four second SSB beams in the second SSB beam set may be evenly distributed after being rotated (180/12) by 15 degrees relative to the first SSB beam, and four third SSB beams in the third SSB beam set may be evenly distributed after being rotated by 15 degrees relative to the second SSB beam. In this way, 12 SSB beams in different directions can cover the sector in the horizontal direction, to increase an SSB coverage gain in the sector.

In another possible implementation, Manner 1 and Manner 2 may be combined to implement joint coverage of different SSB beam sets in a same sector. That the first SSB beam set, the second SSB beam set, and a third SSB beam set jointly cover a 180-degree sector is still used as an example. The first SSB beam set and the second SSB beam set may cover a 120-degree area in a sector in Manner 2, and a remaining 60-degree area in the sector may be covered by the third SSB beam set, so that the first SSB beam set, the second SSB beam set, and the third SSB beam set jointly cover the 180-degree sector.

Manner b2: The beam in the first SSB beam set and the beam in the second SSB beam set cover a same area in a horizontal direction, and an area covered by the first SSB beam set in a vertical direction partially overlaps an area covered by the second SSB beam set in the vertical direction.

In the vertical direction, non-overlapping areas in the first partial area and the second partial area and a partially overlapping area jointly cover an area of the sector in the vertical direction.

In a possible implementation, an area covered by the beams in the first SSB beam set is evenly distributed in an envelope of the sector in the vertical direction (where the first partial area includes discontinuous areas covered by the N first SSB beams), and an area covered by the beams in the second SSB beam set is evenly distributed in the envelope of the sector in the vertical direction (where the second partial area includes discontinuous areas covered by the M second SSB beams). It may be understood as that one second SSB beam is located between at least two first SSB beams. It may also be understood as that the second SSB beams are obtained by rotating the first SSB beams by a specific angle. Therefore, different SSB beam directions are covered in the vertical direction of the sector, so that coverage of the network device is enhanced in the vertical direction.

Manner b3: An area covered by the beam in the first SSB beam set in a horizontal direction partially overlaps an area covered by the beam in the second SSB beam set, and an area covered by the beam in the first SSB beam set in a vertical direction partially overlaps the area covered by the beam in the second SSB beam set.

In the horizontal direction, non-overlapping areas in the first partial area and the second partial area and a partially overlapping area jointly cover an area of the sector in the horizontal direction. In the vertical direction, non-overlapping areas in the first partial area and the second partial area and a partially overlapping area jointly cover an area of the sector in the vertical direction.

In this manner, in the horizontal direction, a distribution manner of the N first SSB beams in the first SSB beam set may be implemented by using the distribution manner of the N first SSB beams in the first SSB beam set in Manner a1, and a distribution manner of the M second SSB beams in the second SSB beam set may be implemented by using the distribution manner of the M second SSB beams in the second SSB beam set in Manner a1. In the vertical direction, a distribution manner of the N first SSB beams in the first SSB beam set may be implemented by using the distribution manner of the N first SSB beams in the first SSB beam set in Manner b2, and a distribution manner of the M second SSB beams in the second SSB beam set may be implemented by using the distribution manner of the M second SSB beams in the second SSB beam set in Manner b2.

The following uses the first SSB beam set and the second SSB beam set as an example to describe a transmission manner of the N first SSB beams and the M second SSB beams.

Manner A1: a fixed manner. It may be understood as that transmission directions of the N first SSB beams remain unchanged in different transmission periodicities, and transmission directions of the M second SSB beams remain unchanged in different transmission periodicities.

The following describes the implementation method in detail with reference to the accompanying drawing. The N first SSB beams in the first SSB beam set may be periodically transmitted in a scanning form, and the M second SSB beams in the second SSB beam set may be periodically transmitted in a scanning form. The following provides descriptions by using an example in which the transmission periodicities of the first SSB beam set are a first periodicity 1, a second periodicity 1, and a third periodicity 1 and the transmission periodicities of the second SSB beam set are a first periodicity 2, a second periodicity 2, and a third periodicity 2. In any one of the first periodicity 1, the second periodicity 1, and the third periodicity 1, the network device may transmit the N first SSB beams in the first SSB beam set in a scanning manner. In any one of the first periodicity 2, the second periodicity 2, and the third periodicity 2, the network device may transmit the M second SSB beams in the second SSB beam set in a scanning manner. For example, N and M are 4. The first periodicity 1 is a smallest periodicity in which the four first SSB beams can be completely transmitted, and the first periodicity 2 is a smallest periodicity in which the four second SSB beams can be completely transmitted. The first SSB beams and the second SSB beams may be sent simultaneously, or may not be sent simultaneously. It should be noted that the second periodicity 1 may be prior to the second periodicity 2, or the second periodicity 2 may be prior to the second periodicity 1. A specific setting manner may be determined based on an actual requirement, and is not limited herein.

Figure 8:
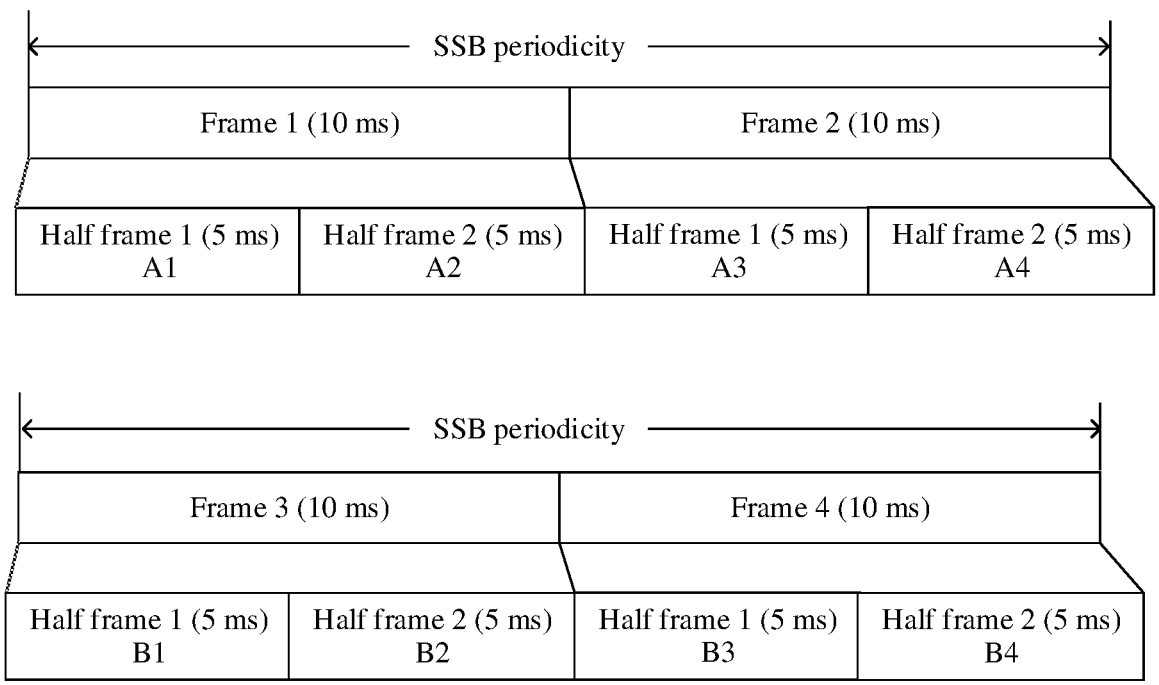
FIG. 8 to FIG. 10 each are a schematic diagram of a beam transmitting periodicity according to an embodiment of this application.

For example, as shown in FIG. 8, in one SSB periodicity (which may be the first periodicity 1 or the first periodicity 2) (where for example, the SSB periodicity is 20 ms), there are two frames: a frame 1 and a frame 2, where each frame is further divided into two half frames. The frame 1 includes a half frame 1 (A1 or B1) and a half frame 2 (A2 or B2). The frame 2 includes a half frame 1 (A3 or B3) and a half frame 2 (A4 or B4). Each half-frame is further divided into a plurality of subframes, which are three downlink subframes (D), one special frame (S), and one uplink frame (U).

For example, the network device may transmit one of the N first SSB beams and one of the M second SSB beams by using a downlink frame (D) and a special frame (S) in the first half frame 1, to simultaneously send the first SSB beam and the second SSB beam. Alternatively, the network device may transmit the first SSB beam by using a downlink frame (D) and a special frame (S) in the first half frame 1, and transmit the second SSB beam by using s downlink frame (D) and s special frame (S) in the second half frame 2.

For another example, the network device may transmit the first SSB beam in the first half frame in A3, and transmit the second SSB beam in the second half frame in A3. For example, a sending moment is in A3 or B3. Alternatively, a sending moment may be in the half frame A2 or B2, or A4 or B4.

For another example, the network device may transmit the first SSB beam in a subframe in the frame 1, and transmit the second SSB beam in a subframe in the frame 2. This is not limited herein.

Manner A2: At least one of the N first SSB beams is transmitted in different directions in different transmission periodicities, and at least one of the M second SSB beams is transmitted in different directions in different transmission periodicities.

In a possible implementation, for example, the first SSB beam set includes a first SSB beam 1 to a first SSB beam 4. A sequence of transmitting the first SSB beams in a first periodicity 1 may be the first SSB beam 1, the first SSB beam 2, the first SSB beam 3, and the first SSB beam 4. A sequence of transmitting the first SSB beams in a second periodicity 1 may be the first SSB beam 4, the first SSB beam 1, the first SSB beam 2, and the first SSB beam 3. A sequence of transmitting the first SSB beams in a third periodicity 1 may be the first SSB beam 3, the first SSB beam 4, the first SSB beam 1, and the first SSB beam 2. Second SSB beams may also be sent with reference to the sending manner of the first SSB beams. For example, a sequence of transmitting the second SSB beams in a first periodicity 2 may be a second SSB beam 1, a second SSB beam 2, a second SSB beam 3, and a second SSB beam 4. A sequence of transmitting the second SSB beams in a second periodicity 2 may be the second SSB beam 4, the second SSB beam 1, the second SSB beam 2, and the second SSB beam 3. A sequence of transmitting the second SSB beams in a third periodicity 2 may be the second SSB beam 3, the second SSB beam 4, the second SSB beam 1, and the second SSB beam 2. Certainly, sending may alternatively be performed in another order. This is not limited herein.

Manner A3: Alternate sending. It may be understood as that at least one of the N first SSB beams is transmitted in different directions in different transmission periodicities, and at least one of the M second SSB beams is transmitted in different directions in different transmission periodicities.

For example, the first SSB beam set and the second SSB beam set jointly cover the same sector. In different transmission periodicities of the first SSB beam set, the first SSB beam set covers different first partial areas. In different transmission periodicities of the first SSB beam set, the second SSB beam set covers different second partial areas.

Figure 9:
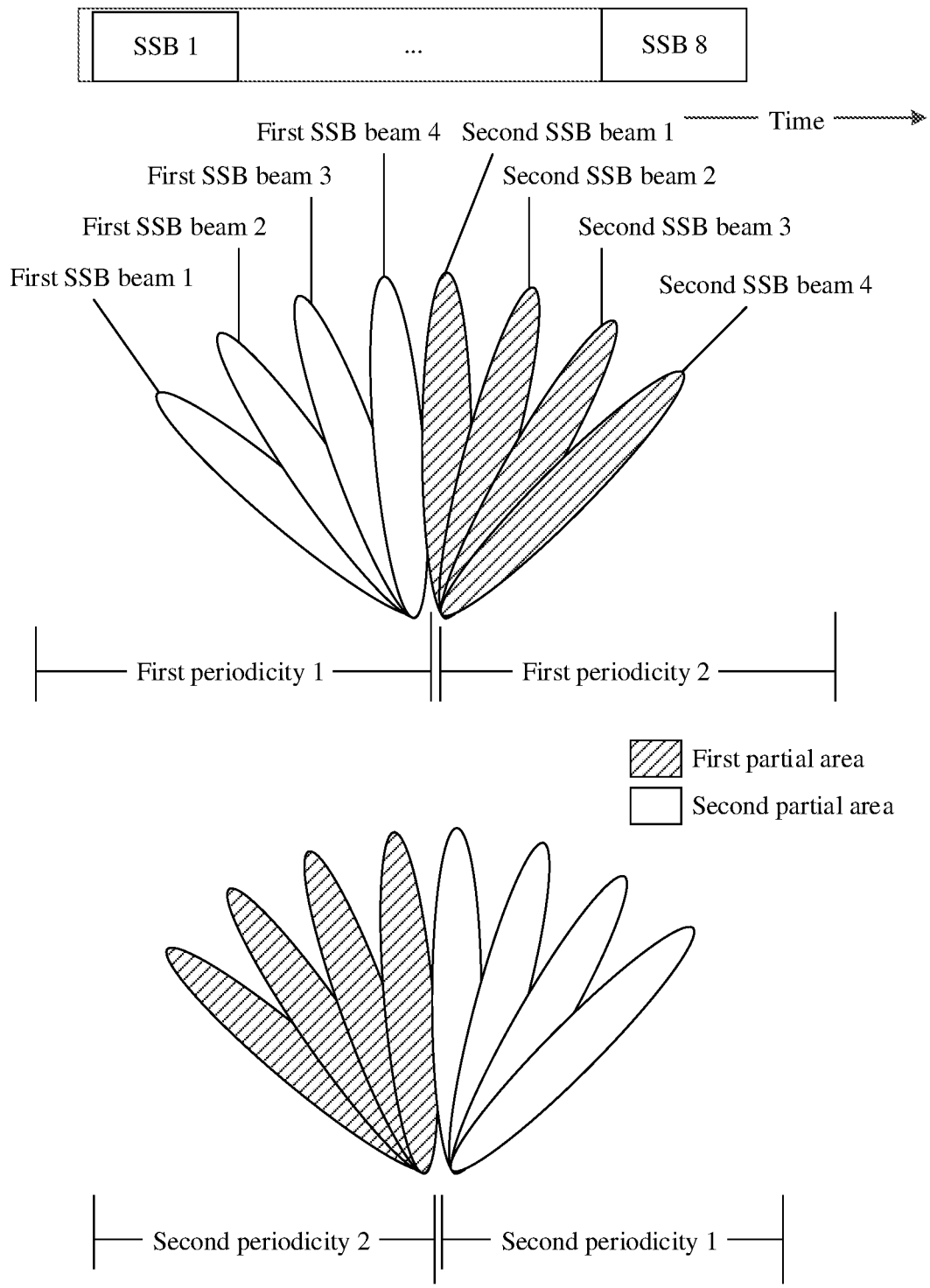

As shown in FIG. 9, for example, the first SSB beam set and the second SSB beam set are distributed in Manner a1. In a first periodicity 1, the first partial area covered by the first SSB beam set is a left-side 60-degree area. The second partial area covered by the second SSB beam set is a right-side 60-degree area. In the first periodicity 1, an SSB 1 to an SSB 4 are sent in a time sequence. In a first periodicity 2, an SSB 5 to an SSB 8 are sent in a time sequence. For example, a first SSB beam 1 is transmitted on the SSB 1, a first SSB beam 2 is transmitted on the SSB 2, a first SSB beam 3 is transmitted on the SSB 3, and a first SSB beam 4 is transmitted on the SSB 4. A second SSB beam 1 is transmitted on the SSB 5, a second SSB beam 2 is transmitted on the SSB 6, a second SSB beam 3 is transmitted on the SSB 6, and a second SSB beam 4 is transmitted on the SSB 8.

In a second periodicity 1, the first partial area covered by the first SSB beam set is a right-side 60-degree area. In a second periodicity 2, the second partial area covered by the second SSB beam set is a left-side 60-degree area. In the second periodicity 1, the first SSB beam 1, the first SSB beam 2, the first SSB beam 3, and the first SSB beam 4 are sent in a time sequence. In the second periodicity 2, the second SSB beam 1, the second SSB beam 2, the second SSB beam 3, and the second SSB beam 4 are transmitted.

According to the foregoing method, the terminal device can receive different SSB beam sets at different locations by measuring SSB beams in different periodicities, to perform SSB measurement, to determine optimal beams, perform beam pairing with the base station more accurately, and improve access performance of the terminal device.

Figure 10:
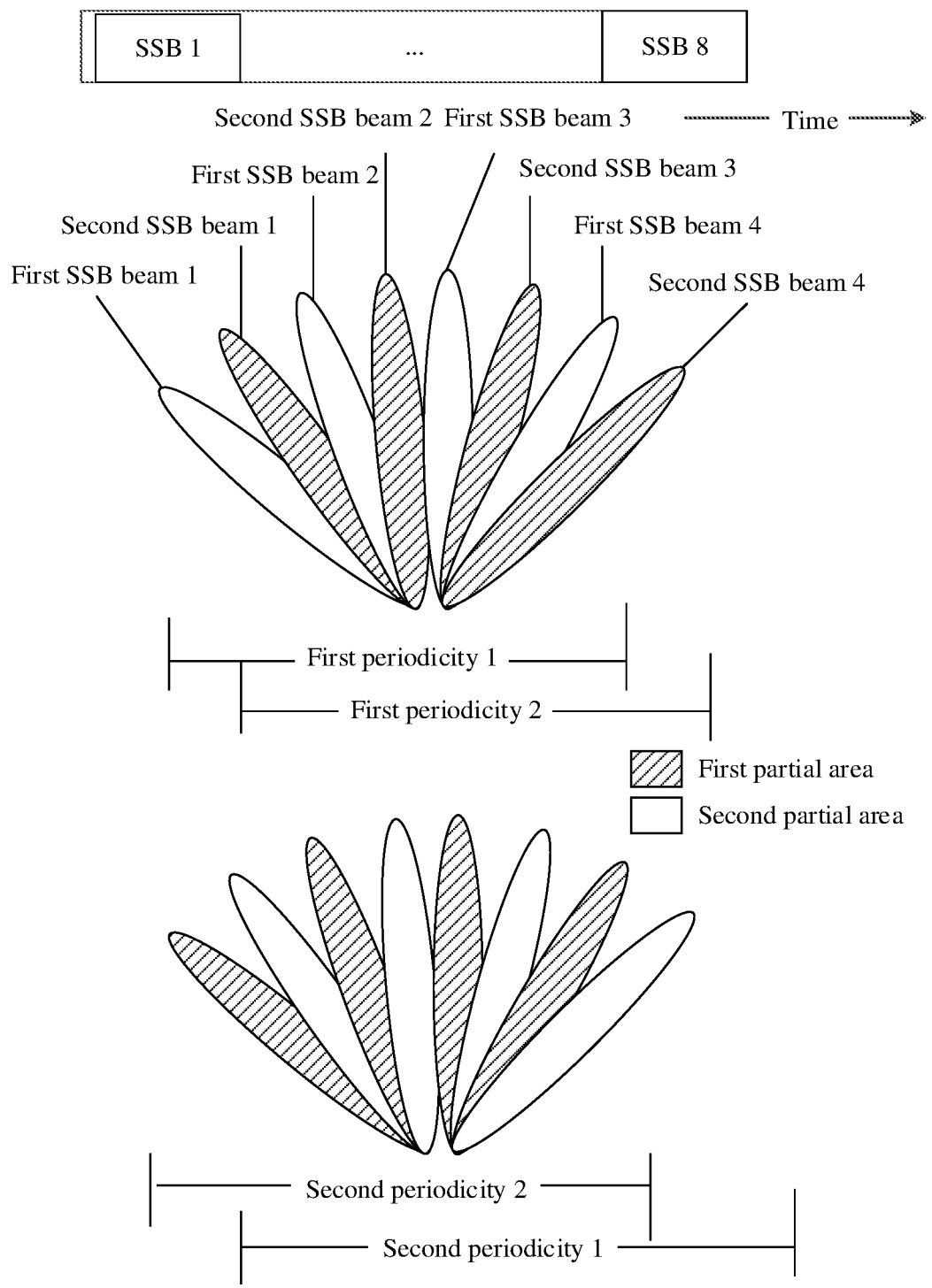

For another example, as shown in FIG. 10, for example, the first SSB beam set and the second SSB beam set are distributed in Manner b1. In a first periodicity 1, the first partial area covered by the first SSB beam set is an area covered by four beams on a left side. In a first periodicity 2, the second partial area covered by the second SSB beam set is an area covered by four beams that are staggered from the first partial area. In a second periodicity 1, the second partial area covered by the second SSB beam set is an area covered by four beams on a left side. In a second periodicity 2, the first partial area covered by the first SSB beam set is an area covered by four beams that are staggered from the second partial area.

According to the foregoing method, when performing SSB measurement, the terminal device can measure beams in different beam directions based on different periodicities, to improve measurement robustness.

After the network device transmits the N first SSB beams and the M second SSB beams, the terminal device may receive N1 first SSB beams on the first initial BWP resource, and/or the terminal device receives M1 second SSB beams on the second initial BWP resource. It should be noted that the terminal device may scan SSB beams from a low frequency to a high frequency, or may scan SSB beams from a high frequency to a low frequency. This is not specifically limited in this application. The quantity N1 of the first SSB beams received by the terminal device and/or the quantity M1 of the second SSB beams received by the terminal device may be determined based on an actual situation such as a location of the terminal device. This is not limited herein.

Step 203: The terminal device accesses, based on the first initial BWP resource, a cell corresponding to the first SSB beam set.

Step 204: The terminal device accesses, based on the second initial BWP resource, a cell corresponding to the second SSB beam set.

The following provides descriptions by using specific scenarios as examples.

Figure 11:
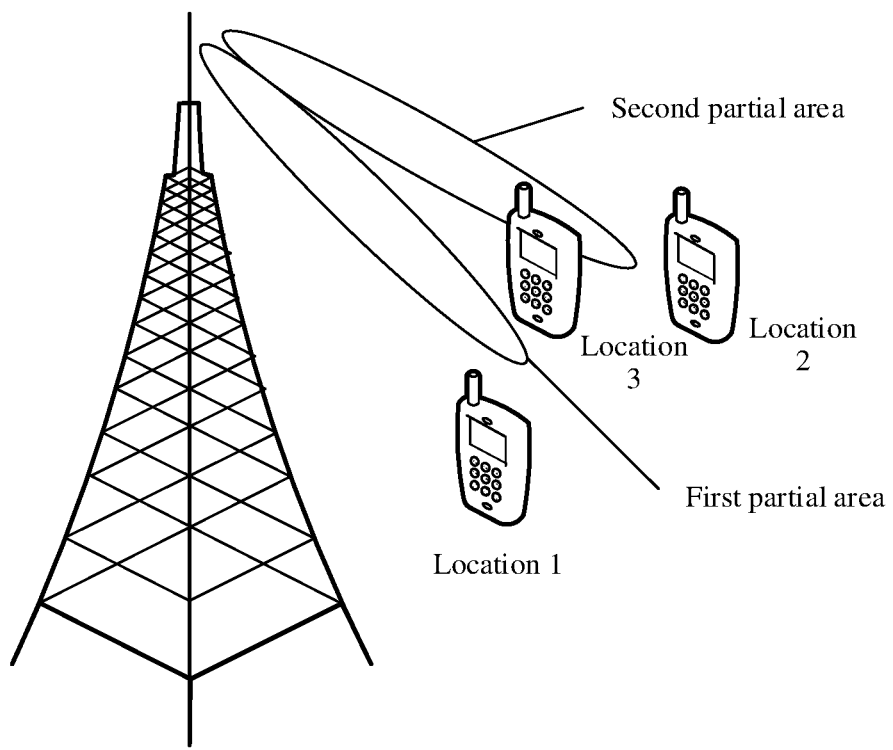
FIG. 11 and FIG. 12 each are a schematic diagram of an application scenario of a coverage enhancement method according to an embodiment of this application.

Manner C1: For example, a distribution manner of the first SSB beam set and the second SSB beam set is a1. As shown in FIG. 11, a carrier aggregation scenario is used as an example. When the terminal device is located in the first partial area (for example, a location 1) covered by the first SSB beam set, the terminal device can receive only the first SSB beam. When the terminal device is located in the second partial area (for example, a location 2) covered by the second SSB beam set, the terminal device can receive only the second SSB beam. The terminal device may receive the first SSB beam and the second SSB beam only when the terminal device is located in an overlapping area (for example, a location 3) between the first partial area and the second partial area. In this scenario, the network device may send indication information to the terminal device, to indicate that the first initial BWP resource and the second initial BWP resource are configured in the current sector. In addition, the first initial BWP resource and the second initial BWP resource may be for jointly covering the current sector. The terminal device may determine, based on the indication information, to implement coverage enhancement in a carrier aggregation manner or a dual connectivity manner.

In a possible manner, when receiving the N1 first SSB beams, the terminal device may measure the N1 first SSB beams, to determine optimal beams as a beam pair for access, and further access, by using the first initial BWP resource, the cell corresponding to the first SSB beam set. After accessing the cell corresponding to the first SSB beam set, the terminal device may further access, by using the indication information of the network device and the second initial BWP resource, the cell corresponding to the second SSB beam set. When receiving the M1 second SSB beams, the terminal device may measure the M1 second SSB beams in the second SSB beam set, to determine optimal beams as a beam pair for access, and further access, by using the second initial BWP resource, the cell corresponding to the second SSB beam set. After accessing the cell corresponding to the second SSB beam set, the terminal device may further access, by using the indication information of the network device and the first initial BWP resource, the cell corresponding to the first SSB beams.

In the carrier aggregation scenario, when receiving the first SSB beams, the terminal device may access, by using the first initial BWP resource based on the received first initial BWP resource and the received second initial BWP resource that are configured by the network device, a carrier corresponding to the first SSB beam set. In this case, the carrier corresponding to the first SSB beam set may be used as a primary carrier of the terminal device. The terminal device may further access, based on the indication information by using the second initial BWP resource, a carrier corresponding to the second SSB beam set. In this case, the carrier corresponding to the second SSB beam set may be used as a secondary carrier of the terminal device.

In a dual connectivity scenario, a first network device may configure the first initial BWP resource for the terminal device, and a second network device may configure the second initial BWP resource for the terminal device. The first network device may send indication information to the terminal device, to indicate the first initial BWP resource. The second network device may send indication information to the terminal device, to indicate the second initial BWP resource.

In a possible manner, when receiving the N1 first SSB beams, the terminal device may measure the N1 first SSB beams in the first SSB beam set, to determine optimal beams as a beam pair for access, and further access, by using the first initial BWP resource, the cell corresponding to the first SSB beam set. In this case, the first network device may be a primary cell of the terminal device. After accessing the cell corresponding to the first SSB beam set, the terminal device may further access, by using the indication information of the second network device and the second initial BWP resource, the cell corresponding to the second SSB beam set, and add the second network device as a secondary base station.

In a possible manner, when receiving the M1 second SSB beams, the terminal device may measure the M1 second SSB beams in the second SSB beam set, to determine optimal beams as a beam pair for access, and further access, by using the second initial BWP resource, the cell corresponding to the second SSB beam set. In this case, the second network device may be a primary cell of the terminal device. After accessing the cell corresponding to the second SSB beam set, the terminal device may further access, by using the indication information of the first network device and the first initial BWP resource, the cell corresponding to the first SSB beam set, and add the first network device as a secondary base station.

Considering that coverage performance of the first SSB beam set is similar to that of the second SSB beam set, when the terminal device accesses one of the beams, it is determined, through indication of the network device, that a beam of a secondary carrier or a secondary cell that may be added further exists in an area range near a direction of a received beam. In this way, according to the foregoing method, the terminal device can access a corresponding coverage enhancement cell without receiving an SSB beam, to implement coverage enhancement of the terminal device.

Manner C2: For example, a distribution manner of the first SSB beam set and the second SSB beam set is b1.

When receiving both the first SSB beam and the second SSB beam, the terminal device may determine, based on measurement values of the received first SSB beam and second SSB beam, to access a beam having better signal quality. For example, the terminal device determines to access the first SSB beam in the first SSB beam set. In this case, the terminal device may access, by using the first initial BWP resource, the cell corresponding to the first SSB beam set. After accessing the cell corresponding to the first SSB beam set, the terminal device may further access, by using indication information of the network device and the second initial BWP resource, the cell corresponding to the second SSB beam set.

In a possible implementation, in this scenario, the terminal device may simultaneously receive the N1 first SSB beams in the first SSB beam set and the M1 second SSB beams in the second SSB beam set. Therefore, before a secondary carrier is added in a carrier aggregation scenario, a corresponding SSB beam may further be measured, to select optimal beams in SSB beams in a corresponding SSB beam set. Before a secondary cell is added in a dual connectivity scenario, a corresponding SSB beam may further be measured, to select optimal beams in SSB beams in a corresponding SSB beam set, to improve beam pairing accuracy.

According to the foregoing method, for a problem that coverage of a massive MIMO broadcast channel is weaker than coverage of a traffic channel, the coverage of the broadcast channel is improved, so that an SSB signal in an area covered by a target traffic beam can be enhanced, and the terminal can perform access. In this way, users who originally can access 5G and obtain good experience but cannot access 5G due to the limited broadcast channel can access a 5G system. This makes up for a weak coverage area, and increases a quantity of system access users.

In a moving process of the terminal device, coverage of a new SSB beam may occur. Alternatively, signal quality of an originally accessed SSB beam deteriorates, and an SSB beam with better signal quality is needed for pairing. In this case, the terminal device may measure a received SSB beam, to determine a coverage area corresponding to the SSB beam, and then determine whether cell handover or carrier handover needs to be performed.

In an implementation, data channel quality may be determined based on an SRS measurement result, and broadcast channel quality is determined based on an SSB measurement result. The SRS measurement result may be, for example, reference signal received power (RSRP) that is of an SRS and that is obtained by the base station or a signal to interference plus noise ratio (SINR) that is of the SRS and that is obtained by the base station. The SSB measurement result may be, for example, RSRP that is of an SSB and that is reported by the terminal.

The base station may obtain reference information fed back by the terminal. The reference information includes a beam identifier of a traffic beam, the SSB measurement result received by the terminal in an area covered by the traffic beam corresponding to the beam identifier, and the uplink sounding reference signal (SRS) measurement result reported by the terminal in the area covered by the traffic beam corresponding to the beam identifier.

The base station may determine, by using different obtained reference information, the terminal device is located in a coverage area of which SSB beam, to determine whether primary/secondary cell reconfiguration or intra-frequency/inter-frequency cell handover needs to be performed.

The different reference information may include reference information that is of different terminals and that is obtained by the base station at a same moment, may further include reference information that is of a same terminal and that is obtained by the base station at different moments, or may further include reference information that is of different terminals and that is obtained by the base station at different moments.

A carrier aggregation scenario is used as an example. For example, a primary carrier of the terminal device is a carrier A corresponding to the first SSB beam set, and a secondary carrier is a carrier B corresponding to the second SSB beam set. Correlation between a received beam in a current sector and a beam in an adjacent sector at a current location may be determined based on an uplink receive signal of a serving cell in which the terminal device is located and an uplink receive signal of an adjacent cell of the terminal device or precoding matrix indicator (PMI) information fed back by the terminal, to determine optimal beams of the terminal device. If it is determined that the optimal beams of the terminal device are still beams in the current sector, cell handover may not be performed, and access to the beam in the current sector is still maintained. If it is determined that the optimal beams of the terminal device are the beams in the adjacent sector, the terminal device may perform cell handover, so that the terminal device accesses a cell corresponding to the optimal beams. The following provides descriptions by using specific scenarios as examples.

Scenario 1: In a moving process of the terminal device, the terminal device is located in a range of the current sector, and still receives only the first SSB beam in the first SSB beam set and/or the second SSB beam in the second SSB beam set in the current sector. In this case, correlation between a received uplink signal and the first SSB beam and/or the second SSB beam may be measured, to determine whether cell handover needs to be performed.

If it is determined that the correlation between the uplink signal and the first SSB beam is the highest and the correlation is greater than a first threshold, it may be considered that the primary carrier of the current terminal device does not need to be handed over, and the terminal device may not perform a corresponding operation.

For example, FIG. 11 is used as an example. A manner of the first SSB beam set and the second SSB beam set is Manner a1, and a sending manner is C1. The terminal device may move from a center (for example, the location 1) of a left area of the current sector to a middle area (for example, the location 2). In this case, an SSB beam received by the terminal device is still the first SSB beam in the first SSB beam set, the correlation between the uplink signal and the first SSB beam is the highest, and the first SSB beam is still an optimal beam. Therefore, the primary carrier does not need to be handed over.

Figure 12:
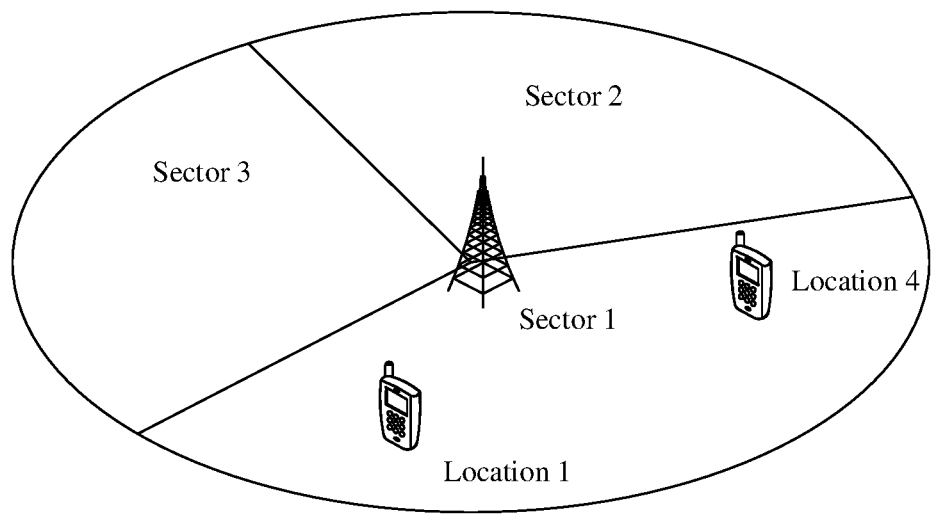

Scenario 2: The terminal device is located in a range in which the current sector overlaps the adjacent sector, and may receive an SSB beam (which is collectively referred to as a third SSB beam below. A plurality of SSB beam sets may also be set in the adjacent sector, for example, a third SSB beam set and a fourth SSB beam set. Only one SSB beam set may alternatively be set in the adjacent sector. This is not limited herein) in the adjacent sector. As shown in FIG. 12, a sector of the terminal device at a location 1 is a sector 1, and an adjacent sector of the terminal device may be a sector 3. After the terminal device moves to a location 4, an adjacent sector of the terminal device may be a sector 2. In a possible implementation, at the location 1, the terminal device accesses the first SSB beam in the first SSB beam set in the sector 1, uses the first SSB beam as a primary carrier, accesses the second SSB beam in the second SSB beam set in the sector 1, and uses the second SSB beam as a secondary carrier. When moving to the location 4, the terminal device receives the third SSB beam in the sector 2, so that the terminal device determines, based on correlation between an uplink signal and the third SSB beam, correlation between the uplink signal and the first SSB beam in the first SSB beam set, and correlation between the uplink signal and the second SSB beam in the second SSB beam set, whether cell handover or primary/secondary carrier handover needs to be performed. Specifically, there may be the following three possible manners.

Manner 1: If it is determined that the correlation between the first SSB beam and the uplink signal is the highest and is greater than a preset threshold, it is considered that the first SSB beam is still an optimal beam. Therefore, no operation may be performed.

Manner 2: If it is determined that the correlation between the second SSB beam and the uplink signal is the highest and is greater than a preset threshold, it is considered that the second SSB beam is an optimal beam. Therefore, in a carrier aggregation scenario, the second SSB beam may be handed over to a beam corresponding to the primary carrier, and the secondary carrier is correspondingly switched to the first SSB beam. Alternatively, in a dual connectivity scenario, the second SSB beam is switched to a beam corresponding to a primary cell, and the first SSB beam is switched to a beam corresponding to a secondary cell.

For example, a manner of the first SSB beam set and the second SSB beam set is Manner a1, and a sending manner is C1. The terminal device may move from the location 1 in the sector 1 to the location 4. In this case, an optimal SSB beam received by the terminal device is the second SSB beam in the second SSB beam set. Therefore, the primary carrier needs to be handed over. The manner of the first SSB beam set and the second SSB beam set is Manner a1, and a sending manner is C2. The terminal device moves from the location 1 in the sector 1 to a center of the sector 1. In this case, optimal SSB beams received by the terminal device in a plurality of periodicities may be the second SSB beams in the second SSB beam set. It is determined, by determining correlation between uplink signals in the plurality of periodicities and the second SSB beams, that correlation of the second SSB beams is higher. Therefore, the primary carrier needs to be handed over to the second SSB beam.

Manner 3: If it is determined that the correlation between the third SSB beam and the uplink signal is the highest and is greater than the preset threshold, it is considered that the third SSB beam is an optimal beam. Therefore, the third SSB beam may be handed over to a beam corresponding to the primary carrier (in a carrier aggregation scenario) or a beam corresponding to a primary cell (in a dual connectivity scenario).

In an implementation, when it is determined that the third SSB beam is an optimal beam, and the third SSB beam is an SSB beam of a carrier A (located on a same carrier as the first SSB beam set) of the sector 2 of the terminal device, the terminal device may be handed over to a cell corresponding to the third SSB beam. That is, the third SSB beam is handed over to the primary carrier of the terminal device, to perform inter-cell intra-frequency handover on the terminal device.

In an implementation, when it is determined that the third SSB beam is an optimal beam, and the third SSB beam is an SSB beam of a carrier B (located on a same carrier as the second SSB beam set) of the sector 2 of the terminal device, the terminal device may be handed over to a cell corresponding to the third SSB beam. That is, the third SSB beam is handed over to the secondary carrier of the terminal device, to perform inter-cell inter-frequency handover on the terminal device.

Correspondingly, the serving cell of the terminal device needs to notify a target cell (the cell corresponding to the third SSB beam) that the terminal device needs to be handed over to the cell corresponding to the third SSB beam, so that the target cell prepares an uplink physical random access channel PRACH resource and a common physical downlink control channel common PDCCH resource for the terminal device.

In the foregoing design, a plurality of SSB beam sets cover a same sector, and joint coverage is formed, so that the terminal device can quickly establish a beam pair having good communication quality with the network device while reducing power consumption overheads and resource overheads.

Figure 13:
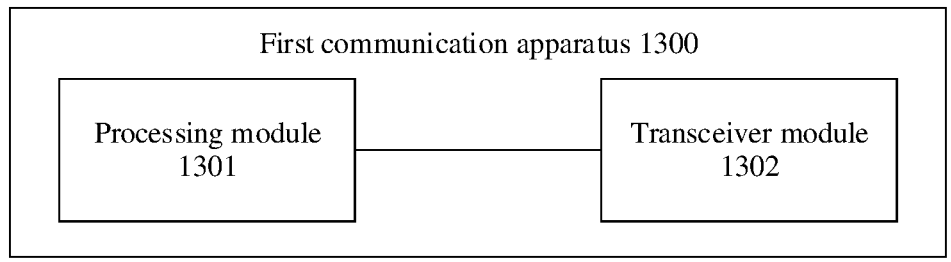
FIG. 13 is a schematic block diagram of a first communication apparatus according to an embodiment of this application.

The following describes, with reference to accompanying drawings, apparatuses configured to implement the foregoing methods in embodiments of this application. Therefore, all the foregoing content may be used in subsequent embodiments. Repeated content is not described again. FIG. 13 is a schematic block diagram of a first communication apparatus 1300 according to an embodiment of this application.

The first communication apparatus 1300 includes a processing module 1301 and a transceiver module 1302. For example, the first communication apparatus 1300 may be a network device, or may be a chip used in the network device, or another combined component or part that has a function of the network device. When the first communication apparatus 1300 is the network device, the transceiver module 1302 may be a transceiver, and the transceiver may include an antenna, a radio frequency circuit, and the like; and the processing module 1301 may be a processor, for example, a baseband processor, and the baseband processor may include one or more central processing units (CPUs). When the first communication apparatus 1300 is a chip system, the transceiver module 1302 may be an input/output interface of a chip (for example, a baseband chip), and the processing module 1301 may be a processor of the chip system, and may include one or more central processing units. It should be understood that the processing module 1301 in this embodiment of this application may be implemented by a processor or a processor-related circuit component, and the transceiver module 1302 may be implemented by a transceiver or a transceiver-related circuit component.

For example, the processing module 1301 may be configured to perform all operations performed by the network device in the embodiment shown in FIG. 2 except sending and receiving operations, and/or configured to support another process of the technology described in this specification. The transceiver module 1302 may be configured to perform all sending and receiving operations performed by the network device in the embodiment shown in FIG. 2, and/or configured to support another process of the technology described in this specification.

In addition, the transceiver module 1302 may be one function module. The function module can complete both a sending operation and a receiving operation. For example, the transceiver module 1302 may be configured to perform all sending operations and receiving operations performed by the network device in the embodiment shown in FIG. 2. For example, when performing the sending operations, the transceiver module 1302 may be considered as a sending module; and when performing the receiving operations, the transceiver module 1302 may be considered as a receiving module. Alternatively, the transceiver module 1302 may be two function modules. The transceiver module 1302 may be considered as a general term of the two function modules. The two function modules are a sending module and a receiving module. The sending module is configured to complete a sending operation. For example, the sending module may be configured to perform all sending operations performed by the network device in the any one of the embodiments shown in FIG. 2. The receiving module is configured to complete a receiving operation. For example, the receiving module may be configured to perform all receiving operations performed by the network device in the embodiment shown in FIG. 2.

The processing module 1301 is configured to transmit N first SSB beams in a first SSB beam set on a first initial BWP resource by using the transceiver module 1302; and transmit M second SSB beams in a second SSB beam set on a second initial BWP resource by using the transceiver module 1302, where coverage of the first SSB beam set is located in a first partial area of a sector, coverage of the second SSB beam set is located in a second partial area of the sector, and N and M are positive integers.

In a possible implementation, the first initial BWP resource and the second initial BWP resource are located on different carriers.

In a possible implementation, a band in which the first initial BWP resource is located is different from a band in which the second initial BWP resource is located.

In a possible implementation, the first partial area and the second partial area are the same in a vertical direction, and are different in a horizontal direction.

In a possible implementation, the first partial area and the second partial area are the same in a horizontal direction, and are different in a vertical direction.

In a possible implementation, the first partial area and the second partial area are at least partially the same and partially different in a horizontal direction, and/or the first partial area and the second partial area are at least partially the same and partially different in a vertical direction.

In a possible implementation, at least one beam direction in the first SSB beam set and at least one beam direction in the second SSB beam set are located in different areas in the horizontal direction; and/or at least one beam direction in the first SSB beam set and at least one beam direction in the second SSB beam set are located in different areas in the vertical direction.

In a possible implementation, the processing module 1301 is configured to periodically transmit the N first SSB beams by using the transceiver module 1302; and periodically transmit the M second SSB beams by using the transceiver module 1302.

In a possible implementation, beam directions of the N first SSB beams transmitted in a first periodicity and a second periodicity are the same; and beam directions of the M second SSB beams transmitted in the first periodicity and the second periodicity are the same.

In a possible implementation, at least one of the N first SSB beams is transmitted in different beam directions in a first periodicity and a second periodicity; and/or at least one of the M second SSB beams is transmitted in different beam directions in a first periodicity and a second periodicity.

In a possible implementation, a location, in the sector, of the first partial area covered by the first SSB beam set in the first periodicity is different from a location, in the sector, of the first partial area covered by the first SSB beam set in the second periodicity; and/or a location, in the sector, of the second partial area covered by the second SSB beam set in the first periodicity is different from a location, in the sector, of the second partial area covered by the second SSB beam set in the second periodicity.

In a possible implementation, the N first SSB beams and the M second SSB beams are transmitted at a same moment; or the N first SSB beams and the M second SSB beams are transmitted at different moments.

Figure 14:
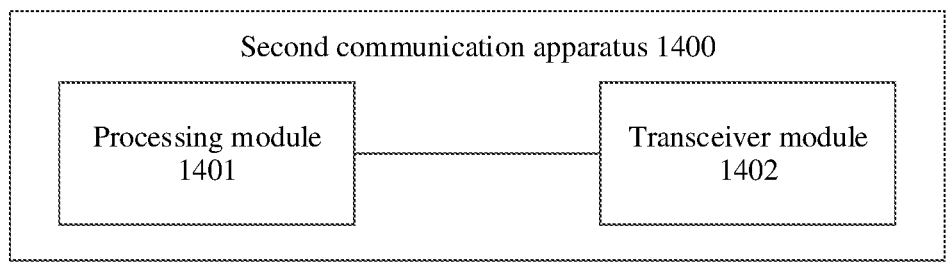
FIG. 14 is a schematic block diagram of a second communication apparatus according to an embodiment of this application.

FIG. 14 is a schematic block diagram of a second communication apparatus 1400 according to an embodiment of this application. The second communication apparatus 1400 includes a processing module 1401 and a transceiver module 1402. For example, the second communication apparatus 1400 may be a terminal device, or may be a chip used in the terminal device, or another combined component or part that has a function of the terminal device. When the second communication apparatus 1400 is the network device, the transceiver module 1402 may be a transceiver, and the transceiver may include an antenna, a radio frequency circuit, and the like; and the processing module 1401 may be a processor, for example, a baseband processor, and the baseband processor may include one or more central processing units (CPUs). When the second communication apparatus 1400 is a component having the function of the terminal device, the transceiver module 1402 may be a radio unit, and the processing module 1401 may be a processor, for example, a baseband processor. When the second communication apparatus 1400 is a chip system, the transceiver module 1402 may be an input/output interface of a chip (for example, a baseband chip), and the processing module 1401 may be a processor of the chip system, and may include one or more central processing units. It should be understood that the processing module 1401 in this embodiment of this application may be implemented by a processor or a processor-related circuit component, and the transceiver module 1402 may be implemented by a transceiver or a transceiver-related circuit component.

For example, the processing module 1401 may be configured to perform all operations performed by the terminal device in the embodiment shown in FIG. 2 except sending and receiving operations, and/or configured to support another process of the technology described in this specification. The transceiver module 1402 may be configured to perform all sending and receiving operations performed by the terminal device in the embodiment shown in FIG. 2, and/or configured to support another process of the technology described in this specification.

In addition, the transceiver module 1402 may be one function module. The function module can complete both a sending operation and a receiving operation. For example, the transceiver module 1402 may be configured to perform all sending operations and receiving operations performed by the terminal device in the embodiment shown in FIG. 2. For example, when performing the sending operations, the transceiver module 1402 may be considered as a sending module; and when performing the receiving operations, the transceiver module 1402 may be considered as a receiving module. Alternatively, the transceiver module 1402 may be two function modules. The transceiver module 1402 may be considered as a general term of the two function modules. The two function modules are a sending module and a receiving module. The sending module is configured to complete a sending operation. For example, the sending module may be configured to perform all sending operations performed by the terminal device in the any one of the embodiments shown in FIG. 2. The receiving module is configured to complete a receiving operation. For example, the receiving module may be configured to perform all receiving operations performed by the terminal device in the embodiment shown in FIG. 2.

The processing module 1401 is configured to receive N1 first SSB beams in a first SSB beam set on a first initial BWP resource by using the transceiver module 1402, and/or receive M1 second SSB beams in a second SSB beam set on a second initial BWP resource by using the transceiver module 1402, where the first SSB beam set covers a first partial area of a sector, the second SSB beam set covers a second partial area of the sector, and N1 and M1 are positive integers. In this way, the processing module 1401 is configured to access, based on the first initial BWP resource, a cell corresponding to the first SSB beam set; and access, based on the second initial BWP resource, a cell corresponding to the second SSB beam set.

In a possible implementation, the first initial BWP resource and the second initial BWP resource are located on different carriers.

In a possible implementation, a band in which the first initial BWP resource is located is different from a band in which the second initial BWP resource is located.

In a possible implementation, the first partial area and the second partial area are the same in a vertical direction, and are different in a horizontal direction.

In a possible implementation, the first partial area and the second partial area are the same in a horizontal direction, and are different in a vertical direction.

In a possible implementation, the first partial area and the second partial area are at least partially the same and partially different in a horizontal direction, and/or the first partial area and the second partial area are at least partially the same and partially different in a vertical direction.

In a possible implementation, at least one beam direction in the first SSB beam set and at least one beam direction in the second SSB beam set are located in different areas in the horizontal direction; and/or at least one beam direction in the first SSB beam set and at least one beam direction in the second SSB beam set are located in different areas in the vertical direction.

In a possible implementation, the processing module 1401 is configured to periodically receive the N1 first SSB beams by using the transceiver module 1402; and/or the processing module 1401 is configured to periodically receive the M1 second SSB beams by using the transceiver module 1402.

In a possible implementation, beam directions of the N1 first SSB beams received in a first periodicity and a second periodicity are the same; and/or beam directions of the M1 second SSB beams received in a first periodicity and a second periodicity are the same.

In a possible implementation, at least one of the N1 first SSB beams is received in different beam directions in a first periodicity and a second periodicity; and/or at least one of the M1 second SSB beams is received in different beam directions in a first periodicity and a second periodicity.

In a possible implementation, a location, in the sector, of the first partial area covered by the first SSB beam set in the first periodicity is different from a location, in the sector, of the first partial area covered by the first SSB beam set in the second periodicity; and/or a location, in the sector, of the second partial area covered by the second SSB beam set in the first periodicity is different from a location, in the sector, of the second partial area covered by the second SSB beam set in the second periodicity.

In a possible implementation, the processing module 1401 is configured to, before accessing, based on the first initial BWP resource, the cell corresponding to the first SSB beams, measure the N1 first SSB beams; and/or the processing module 1401 is configured to, before accessing, based on the second initial BWP resource, the cell corresponding to the second SSB beams, measure the M1 second SSB beams.

In a possible implementation, the N1 first SSB beams and the M1 second SSB beams are received at a same moment; or the N1 first SSB beams and the M1 second SSB beams are received at different moments.

An embodiment of this application further provides a communication apparatus. The communication apparatus may be a network device, a terminal device, or a circuit. The communication apparatus may be configured to perform an action performed by the network device or the terminal device in the foregoing method embodiments.

Figure 15:
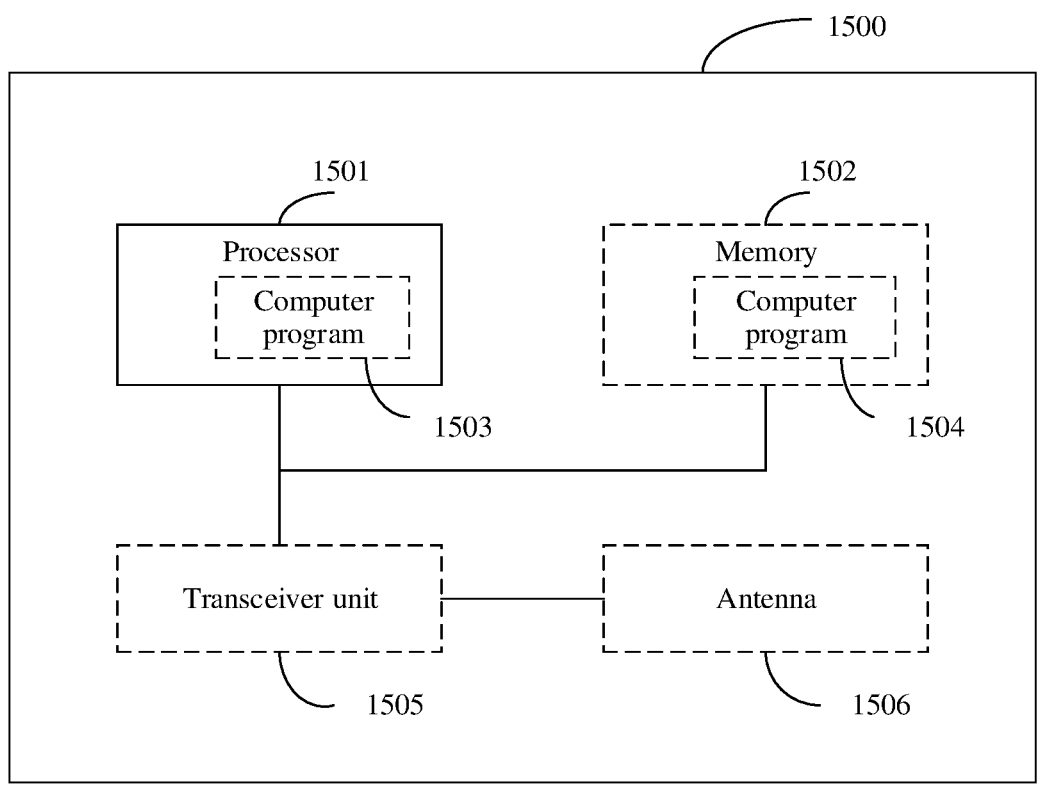
FIG. 15 is a schematic block diagram of a communication apparatus according to an embodiment of this application.

Based on a same concept as the foregoing coverage enhancement method, as shown in FIG. 15, an embodiment of this application further provides a communication apparatus 1500. The communication apparatus 1500 may be configured to implement the method performed by the network device or the terminal device in the foregoing method embodiment. Refer to the descriptions in the foregoing method embodiment. The communication apparatus 1500 may be a network device or a terminal device, or may be located in the network device or the terminal device, and may be a transmitting end device or a receiving end device.

The communication apparatus 1500 includes one or more processors 1501. The processor 1501 may be a general-purpose processor, a dedicated processor, or the like. For example, the processor 1501 may be a baseband processor or a central processing unit. The baseband processor may be configured to process a communication protocol and communication data. The central processing unit may be configured to control the communication apparatus (for example, a network device, a terminal device, a vehicle-mounted device, or a chip), execute a software program, and process data of the software program. The communication apparatus 1500 may include a transceiver unit, configured to input (receive) and output (send) signals. For example, the transceiver unit may be a transceiver, a radio frequency chip, or the like.

The communication apparatus 1500 includes the one or more processors 1501. The one or more processors 1501 may implement the method performed by the network device or the terminal device in the foregoing embodiment.

Optionally, the processor 1501 may further implement another function in addition to the method in the foregoing embodiment. Optionally, in an implementation, the processor 1501 may execute a computer program, so that the communication apparatus 1500 performs the method performed by the network device or the terminal device in the foregoing method embodiment. All or some of the computer programs may be stored in the processor 1501, for example, a computer program 1503; or may be stored in a memory 1502 coupled to the processor 1501, for example, a computer program 1504. Alternatively, computer programs 1503 and 1504 may be used together to enable the communication apparatus 1500 to perform the method performed by the network device or the terminal device in the foregoing method embodiment.

In another possible implementation, the communication apparatus 1500 may alternatively include a circuit. The circuit may implement functions performed by the network device or the terminal device in the foregoing method embodiment.

In another possible implementation, the communication apparatus 1500 may include one or more memories 1502. The one or more memories 1502 store a computer program 1504. The computer program may be run on the processor, so that the communication apparatus 1500 performs the encoding method in the foregoing method embodiment. Optionally, the memory may further store data. Optionally, the processor may alternatively store a computer program and/or data. For example, the one or more memories 1502 may store the association or the correspondence in the foregoing embodiment, or the related parameter or table in the foregoing embodiment. The processor and the memory may be separately disposed, or may be integrated with or coupled to each other.

In another possible implementation, the communication apparatus 1500 may further include a transceiver unit 1505. The processor 1501 may be referred to as a processing unit, and controls the communication apparatus (a first communication apparatus or a second communication apparatus). The transceiver unit 1505 may be referred to as a transceiver, a transceiver circuit, or the like, and is configured to implement receiving and sending of data or control signaling.

For example, if the communication apparatus 1500 is a chip used in a communication device or another combined component, part, or the like that has a function of the communication device, the communication apparatus 1500 may include the transceiver unit 1505.

In another possible implementation, the communication apparatus 1500 may further include a transceiver unit 1505 and an antenna 1506. The processor 1501 may be referred to as a processing unit, and controls the communication apparatus (a first coverage enhancement or a second communication apparatus). The transceiver unit 1505 may be referred to as a transceiver, a transceiver circuit, or the like, and is configured to implement a transceiver function of the apparatus by using the antenna 1506.

In an embodiment, the processor 1501 is configured to transmit N first SSB beams in a first SSB beam set on a first initial BWP resource by using the transceiver unit 1505; and transmit M second SSB beams in a second SSB beam set on a second initial BWP resource by using the transceiver unit 1505, where coverage of the first SSB beam set is located in a first partial area of a sector, coverage of the second SSB beam set is located in a second partial area of the sector, and N and M are positive integers.

In another embodiment, the processor 1501 is configured to receive N1 first SSB beams in a first SSB beam set on a first initial BWP resource by using the transceiver unit 1505, and/or receive M1 second SSB beams in a second SSB beam set on a second initial BWP resource by using the transceiver unit 1505, where the first SSB beam set covers a first partial area of a sector, the second SSB beam set covers a second partial area of the sector, and N1 and M1 are positive integers. In this way, the processor 1501 is configured to: access, based on the first initial BWP resource, a cell corresponding to the first SSB beam set; and access, based on the second initial BWP resource, a cell corresponding to the second SSB beam set.

It should be noted that the processor in embodiments of this application may be an integrated circuit chip, and has a signal processing capability. In an implementation process, steps in the foregoing method embodiments may be implemented by using an integrated logic circuit of hardware in the processor, or by using a computer program in a form of software. The foregoing processor may be a general-purpose processor, a digital signal processor (DSP), an application specific integrated circuit (ASIC), a field programmable gate array (FPGA) or another programmable logic device, a discrete gate or a transistor logic device, or a discrete hardware component. The processor may implement or perform the methods, steps, and logical block diagrams disclosed in embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware in a decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory, and completes the steps in the foregoing methods in combination with hardware of the processor.

It may be understood that the memory in embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) that is used as an external cache. By way of example but not limitative description, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory in the system and method described in this specification aims to include, but not limited to, these memories and any memory of another appropriate type.

An embodiment of this application further provides a computer-readable storage medium. The computer-readable storage medium stores a computer program. When the computer program is executed by a computer, the method in any one of the foregoing method embodiments that is applied to the network device or the terminal device is implemented.

An embodiment of this application further provides a computer program product. When the computer program product is executed by a computer, the method in any one of the foregoing method embodiments that is applied to the network device or the terminal device is implemented.

An embodiment of this application further provides a communication system. The communication system includes the first communication apparatus shown in FIG. 13 or the communication apparatus shown in FIG. 15, and includes the second communication apparatus shown in FIG. 14 or the communication apparatus shown in FIG. 15.

All or some of the foregoing embodiments may be implemented by using software, hardware, firmware, or any combination thereof. When software is used for implementation, embodiments may be implemented completely or partially in a form of a computer program product. The computer program product includes one or more computer programs. When the computer programs are loaded and executed on a computer, the procedures or functions according to embodiments of this application are all or partially generated. The computer may be a general-purpose computer, a dedicated computer, a computer network, or another programmable apparatus. The computer programs may be stored in a computer-readable storage medium or may be transmitted from a computer-readable storage medium to another computer-readable storage medium. For example, the computer programs may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

An embodiment of this application further provides a communication apparatus, including a processor and an interface. The processor is configured to perform the method in any one of the foregoing method embodiments that is applied to the network device or the terminal device.

It should be understood that the foregoing processing apparatus may be a chip. The processor may be implemented by using hardware, or may be implemented by using software. When being implemented by using hardware, the processor may be a logic circuit, an integrated circuit, or the like. When being implemented by using software, the processor may be a general-purpose processor, and is implemented by reading software code stored in a memory. The memory may be integrated into the processor, or may exist independently outside the processor.

An embodiment of this application further provides a computer-readable storage medium. The computer-readable storage medium stores a computer program. When the computer program is executed by a computer, the computer may implement a procedure related to the network device or the terminal device in the embodiment shown in FIG. 2 provided in the method embodiments.

An embodiment of this application further provides a computer program product. The computer program product is configured to store a computer program. When the computer program is executed by a computer, the computer may implement a procedure related to the network device or the terminal device in the embodiment shown in FIG. 2 provided in the method embodiments.

It should be understood that the processor mentioned in embodiments of this application may be a CPU, or may be another general-purpose processor, a digital signal processor (DSP), an application specific integrated circuit (ASIC), a field programmable gate array (FPGA) or another programmable logic device, a discrete gate, a transistor logic device, a discrete hardware component, or the like. The general-purpose processor may be a microprocessor, or the processor may be any conventional processor or the like.

It should be further understood that the memory mentioned in embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) that is used as an external cache. By way of example but not limitative description, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general-purpose processor, a DSP, an ASIC, an FPGA or another programmable logic device, a discrete gate, a transistor logic device, or a discrete hardware component, the memory (a storage module) is integrated into the processor.

It should be noted that the memory described in this specification aims to include but is not limited to these memories and any memory of another appropriate type.

It should be understood that sequence numbers of the foregoing processes do not mean execution sequences in embodiments of this application. The execution sequences of the processes should be determined based on functions and internal logic of the processes, and should not constitute any limitation on implementation processes of embodiments of this application.

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for a particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the foregoing apparatus embodiment is merely an example. For example, division into the units is merely logical function division, and may be other division in actual implementation. For example, a plurality of units or components may be combined, or may be integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, and may be located in one position, or may be distributed on a plurality of network units. Some or all of the units may be selected based on an actual requirement to achieve the objectives of the solutions in embodiments.

In addition, functional units in embodiments of this application may be integrated into one processing unit, each unit may exist alone physically, or two or more units may be integrated into one unit.

When the functions are implemented in the form of a software functional unit and sold or used as an independent product, the functions may be stored in a computer-readable storage medium. Based on such an understanding, the technical solutions in this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods in embodiments of this application. The foregoing computer-readable storage medium may be any available medium that can be accessed by a computer. By way of example but not limitation, the computer-readable medium may include a random access memory (RAM), a read-only memory (ROM), an electrically erasable programmable read only memory (EEPROM), a compact disc read-only memory (CD-ROM), a universal serial bus flash disk, a removable hard disk or another compact disc storage, a magnetic disk storage medium or another magnetic storage device, or any other medium that can be for carrying or storing expected program code in a form of instructions or a data structure and that can be accessed by a computer.

The foregoing descriptions are merely specific implementations of this application, but the protection scope of embodiments of this application is not limited thereto. Any variation or replacement readily figured out by a person skilled in the art within the technical scope disclosed in embodiments of this application shall fall within the protection scope of embodiments of this application. Therefore, the protection scope of embodiments of this application shall be subject to the protection scope of the claims.

What is claimed is:

1. A method, comprising:
    transmitting N first synchronization signal block (SSB) beams in a first SSB beam set on a first initial bandwidth part (BWP) resource; and
    transmitting M second SSB beams in a second SSB beam set on a second initial BWP resource, wherein:
    coverage of the first SSB beam set comprises a first partial area of a sector, coverage of the second SSB beam set comprises a second partial area of the sector, and N and M are positive integers, and
    the N first SSB beams and the M second SSB beams jointly provide enhanced SSB coverage within the sector.

2. The method according to claim 1, wherein the first SSB beam set and the second SSB beam set are located on different carriers.

3. The method according to claim 2, wherein a band in which the first initial BWP resource is located is different from a band in which the second initial BWP resource is located.

4. The method according to claim 1, wherein at least one of:
    the first partial area and the second partial area are the same in a vertical direction, and are different in a horizontal direction;
    the first partial area and the second partial area are the same in the horizontal direction, and are different in the vertical direction; or
    at least one of the first partial area and the second partial area are at least partially the same and partially different in the horizontal direction, or the first partial area and the second partial area are at least partially the same and partially different in the vertical direction.

5. The method according to claim 4, wherein:
    the first partial area and the second partial area being at least partially the same and partially different in the horizontal direction comprises at least one beam direction in the first SSB beam set and at least one beam direction in the second SSB beam set being located in different areas in the horizontal direction; and
    the first partial area and the second partial area being at least partially the same and partially different in the vertical direction comprises at least one beam direction in the first SSB beam set and at least one beam direction in the second SSB beam set being located in different areas in the vertical direction.

6. The method according to claim 1, wherein the transmitting N first SSB beams and the transmitting M second SSB beams comprise:
    periodically transmitting the N first SSB beams; and
    periodically transmitting the M second SSB beams.

7. The method according to claim 6, wherein the transmitting N first SSB beams and the transmitting M second SSB beams comprise:
    beam directions of the N first SSB beams transmitted in a first periodicity and a second periodicity are the same; and
    beam directions of the M second SSB beams transmitted in the first periodicity and the second periodicity are the same.

8. The method according to claim 6, wherein at least one of:
- the transmitting the N first SSB beams comprises at least one of the N first SSB beams being transmitted in different beam directions in a first periodicity and a second periodicity; or
- the transmitting the M second SSB beams comprises at least one of the M second SSB beams being transmitted in different beam directions in a first periodicity and a second periodicity.

9. The method according to claim 8, wherein at least one of:
- the at least one of the N first SSB beams being transmitted in different beam directions in the first periodicity and the second periodicity comprises a location, in the sector, of the first partial area covered by the first SSB beam set in the first periodicity being different from a location, in the sector, of the first partial area covered by the first SSB beam set in the second periodicity; or
- the at least one of the M second SSB beams being transmitted in a different beam direction in each periodicity comprises a location, in the sector, of the second partial area covered by the second SSB beam set in the first periodicity being different from a location, in the sector, of the second partial area covered by the second SSB beam set in the second periodicity.

10. A method, comprising:
- receiving N first synchronization signal block (SSB) beams in a first SSB beam set on a first initial bandwidth part (BWP) resource, and receiving M second SSB beams in a second SSB beam set on a second initial BWP resource, wherein:
  - the first SSB beam set covers a first partial area of a sector, the second SSB beam set covers a second partial area of the sector, and N and M are positive integers, and
  - the N first SSB beams and the M second SSB beams jointly provide enhanced SSB coverage within the sector;
- accessing, based on the first initial BWP resource, a cell corresponding to the first SSB beam set; and
- accessing, based on the second initial BWP resource, a cell corresponding to the second SSB beam set.

11. The method according to claim 10, wherein the first initial BWP resource and the second initial BWP resource are located on different carriers.

12. The method according to claim 11, wherein a band in which the first initial BWP resource is located is different from a band in which the second initial BWP resource is located.

13. The method according to claim 10, wherein at least one of:
- the first partial area and the second partial area are the same in a vertical direction, and are different in a horizontal direction;
- the first partial area and the second partial area are the same in the horizontal direction, and are different in the vertical direction; or
- at least one of the first partial area and the second partial area are at least partially the same and partially different in the horizontal direction, or the first partial area and the second partial area are at least partially the same and partially different in the vertical direction.

14. The method according to claim 13, wherein at least one of:
- the first partial area and the second partial area being at least partially the same and partially different in the horizontal direction comprises at least one beam direction in the first SSB beam set and at least one beam direction in the second SSB beam set being located in different areas in the horizontal direction; and/or
- the first partial area and the second partial area being at least partially the same and partially different in the vertical direction comprises at least one beam direction in the first SSB beam set and at least one beam direction in the second SSB beam set being located in different areas in the vertical direction.

15. The method according to claim 10, wherein at least one of:
- the receiving the N first SSB beams comprises periodically receiving the N first SSB beams; or
- receiving the M second SSB beams comprises periodically receiving the M second SSB beams.

16. The method according to claim 15, wherein at least one of:
- periodically receiving the N first SSB beams comprises beam directions of the N first SSB beams received in a first periodicity and a second periodicity are the same; or
- periodically receiving the M second SSB beams comprises beam directions of the M second SSB beams received in a first periodicity and a second periodicity are the same.

17. The method according to claim 15, wherein at least one of:
- periodically receiving the N first SSB beams comprises at least one of the N first SSB beams being received in different beam directions in a first periodicity and a second periodicity; or
- periodically receiving the M second SSB beams comprises at least one of the M second SSB beams being received in different beam directions in a first periodicity and a second periodicity.

18. The method according to claim 16, wherein at least one of:
- the at least one of the N first SSB beams being received in different beam directions in the first periodicity and the second periodicity comprises a location, in the sector, of the first partial area covered by the first SSB beam set in the first periodicity being different from a location, in the sector, of the first partial area covered by the second SSB beam set in the second periodicity; or
- the at least one of the M second SSB beams being received in different beam directions in the first periodicity and the second periodicity comprises a location, in the sector, of the second partial area covered by the first SSB beam set in the first periodicity being different from a location, in the sector, of the second partial area covered by the second SSB beam set in the second periodicity.

19. The method according to claim 17, wherein the method further comprises at least one of:
- measuring, before the accessing, based on the first initial BWP resource, the cell corresponding to the first SSB beams, the N received first SSB beams; or
- measuring, before the accessing, based on the second initial BWP resource, the cell corresponding to the second SSB beams, the M received second SSB beams.

20. A communication apparatus, comprising:
- at least one processor;
- a communication interface; and
- a non-transitory computer-readable storage medium storing a program to be executed by the at least one processor, the program including instructions to cause the communication apparatus to perform:

receiving N first synchronization signal block (SSB) beams in a first SSB beam set on a first initial bandwidth part (BWP) resource, and receiving M second SSB beams in a second SSB beam set on a second initial BWP resource, wherein:

the first SSB beam set covers a first partial area of a sector, the second SSB beam set covers a second partial area of the sector, and N and M are positive integers, and the N first SSB beams and the M second SSB beams jointly provide enhanced SSB coverage within the sector;

accessing, based on the first initial BWP resource, a cell corresponding to the first SSB beam set; and accessing, based on the second initial BWP resource, a cell corresponding to the second SSB beam set.

* * * * *